(12) United States Patent
Kubota

(10) Patent No.: US 10,171,347 B2
(45) Date of Patent: Jan. 1, 2019

(54) DATA TRANSFER CONTROL METHOD, RELAY DEVICE, AND DATA TRANSFER CONTROL DEVICE

(71) Applicant: FUJITSU LIMITED, Kawasaki-shi, Kanagawa (JP)

(72) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1044 days.

(21) Appl. No.: 14/220,225

(22) Filed: Mar. 20, 2014

(65) Prior Publication Data

US 2014/0289373 A1    Sep. 25, 2014

(30) Foreign Application Priority Data

Mar. 21, 2013  (JP) .................................. 2013-058609

(51) Int. Cl.
| | | |
|---|---|---|
| *H04L 12/707* | (2013.01) | |
| *H04B 17/27* | (2015.01) | |
| *H04W 40/24* | (2009.01) | |

(52) U.S. Cl.
CPC .............. *H04L 45/24* (2013.01); *H04B 17/27* (2015.01); *H04W 40/24* (2013.01)

(58) Field of Classification Search
CPC ...... H04L 45/24; H04L 45/2402; H04L 45/50; H04B 17/27
USPC ............. 709/219; 340/539.22; 370/219, 328, 370/221, 228, 252
See application file for complete search history.

(56) References Cited

U.S. PATENT DOCUMENTS

| | | | | |
|---|---|---|---|---|
| 7,577,420 B2* | 8/2009 | Srinivasan | ........... | G08B 25/006 340/287 |
| 7,940,669 B2* | 5/2011 | Vaswani | ................. | H04L 45/00 370/238 |
| 8,326,322 B2* | 12/2012 | Lagrange | .............. | H04W 40/12 455/414.2 |
| 8,446,276 B2* | 5/2013 | Rice | ..................... | H04B 7/1851 340/539.22 |

(Continued)

FOREIGN PATENT DOCUMENTS

| | | |
|---|---|---|
| JP | 2000-138711 | 5/2000 |
| JP | 2004-282111 A | 10/2004 |

OTHER PUBLICATIONS

Chan H, Perrig A. Pike: Peer intermediaries for key establishment in sensor networks. InIEEE INFOCOM Mar. 5, 2005 (vol. 1, p. 524). Institute of Electrical Engineers Inc (IEEE). (Year: 2005).*

(Continued)

*Primary Examiner* — Ranodhi Serrao
*Assistant Examiner* — James N Fiorillo
(74) *Attorney, Agent, or Firm* — Fujitsu Patent Center

(57) ABSTRACT

A transfer path between a sensor and a data processing server is partitioned into at least a first transfer path between the sensor and a first relay device, a second transfer path from the first relay device to a second relay device that transfers the data transmitted from the first sensor, and a third transfer path between the second relay device and the data processing server. A data transfer between each of the sensors and the data processing server is implemented by respectively controlling a pair of the first transfer path and the second transfer path, and a pair of the second transfer path and the third transfer path.

7 Claims, 57 Drawing Sheets

(56) References Cited

U.S. PATENT DOCUMENTS

| | | | | |
|---|---|---|---|---|
| 9,537,759 | B2* | 1/2017 | Calmon | H04B 7/15521 |
| 2003/0076791 | A1* | 4/2003 | Sawabe | H04W 36/26 |
| | | | | 370/328 |
| 2004/0208148 | A1* | 10/2004 | Cooper | H04W 72/044 |
| | | | | 370/336 |
| 2004/0258017 | A1* | 12/2004 | Beard | H04B 7/2656 |
| | | | | 370/329 |
| 2005/0117592 | A1* | 6/2005 | Nagami | H04L 45/00 |
| | | | | 370/401 |
| 2006/0112272 | A1* | 5/2006 | Morioka | H04L 63/0227 |
| | | | | 713/171 |
| 2006/0146708 | A1* | 7/2006 | Kanazawa | H04L 47/10 |
| | | | | 370/232 |
| 2007/0262863 | A1* | 11/2007 | Aritsuka | H04B 17/27 |
| | | | | 340/539.22 |
| 2007/0266423 | A1* | 11/2007 | Tehee, Jr. | F03D 7/028 |
| | | | | 726/3 |
| 2008/0155064 | A1* | 6/2008 | Kosuge | E03F 7/00 |
| | | | | 709/219 |
| 2009/0003232 | A1* | 1/2009 | Vaswani | H04L 45/00 |
| | | | | 370/252 |
| 2009/0010201 | A1* | 1/2009 | Kawakami | H04L 45/50 |
| | | | | 370/328 |
| 2009/0016264 | A1* | 1/2009 | Hirano | H04W 8/08 |
| | | | | 370/328 |
| 2009/0016277 | A1* | 1/2009 | Kawakami | H04L 45/50 |
| | | | | 370/329 |
| 2009/0046664 | A1* | 2/2009 | Aso | H04L 1/1874 |
| | | | | 370/331 |
| 2009/0052425 | A1* | 2/2009 | Aso | H04W 8/26 |
| | | | | 370/338 |
| 2009/0154343 | A1* | 6/2009 | Fitch | H04B 1/74 |
| | | | | 370/221 |
| 2009/0187283 | A1* | 7/2009 | Laursen | F03D 7/047 |
| | | | | 700/287 |
| 2010/0054183 | A1* | 3/2010 | Shin | H04L 45/02 |
| | | | | 370/328 |
| 2013/0211611 | A1* | 8/2013 | Ahrensbach | F03D 7/047 |
| | | | | 700/287 |
| 2014/0016468 | A1* | 1/2014 | Daraiseh | H04L 45/121 |
| | | | | 370/235 |
| 2014/0029411 | A1* | 1/2014 | Nayak | H04L 41/0654 |
| | | | | 370/219 |
| 2015/0281074 | A1* | 10/2015 | Kubota | H04L 45/745 |
| | | | | 370/315 |

OTHER PUBLICATIONS

Japanese Office Action dated Sep. 6, 2016 for corresponding Japanese Patent Application No. 2013-058609, with Partial English Translation, 5 pages.

* cited by examiner

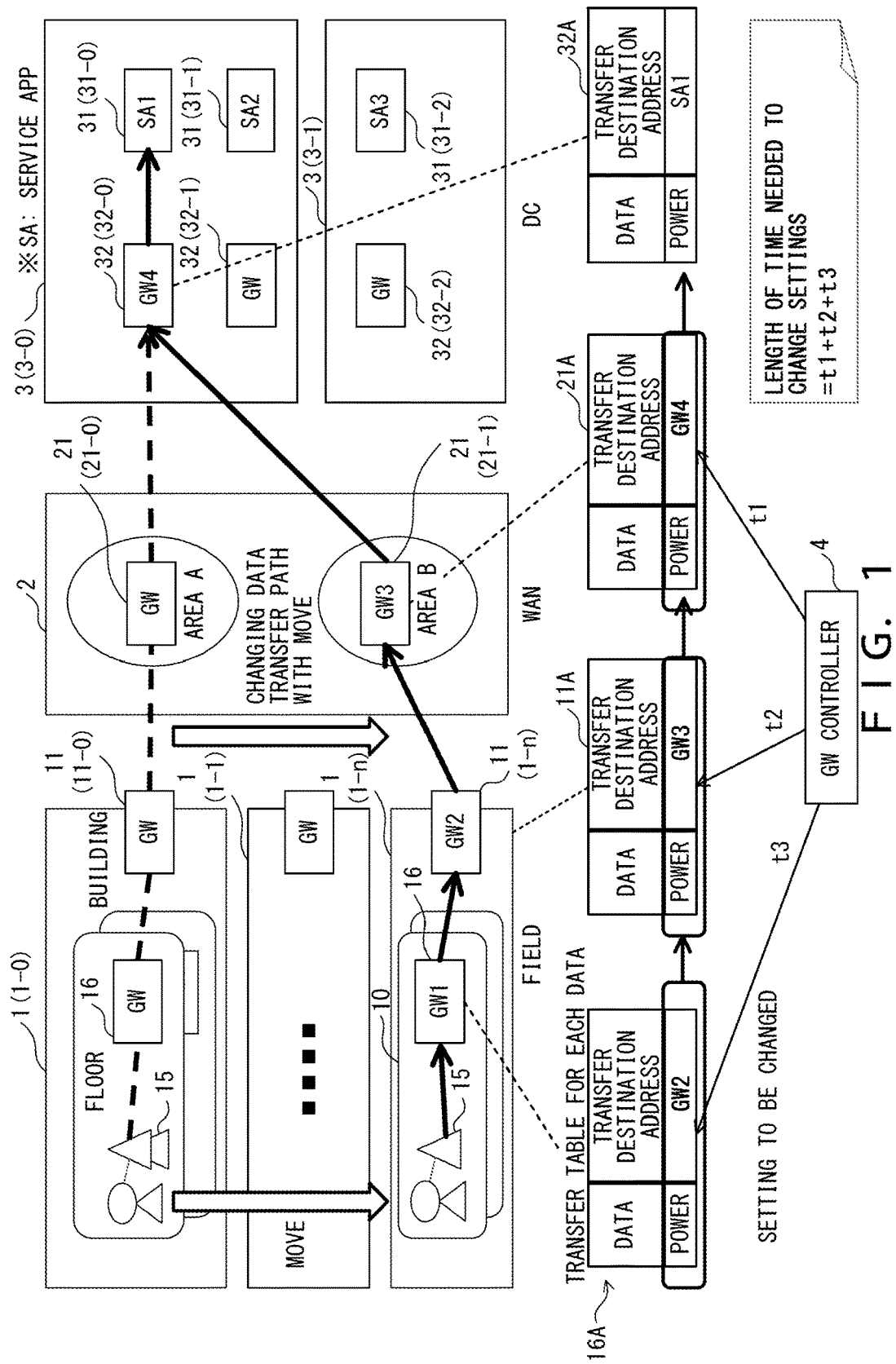
F I G. 1

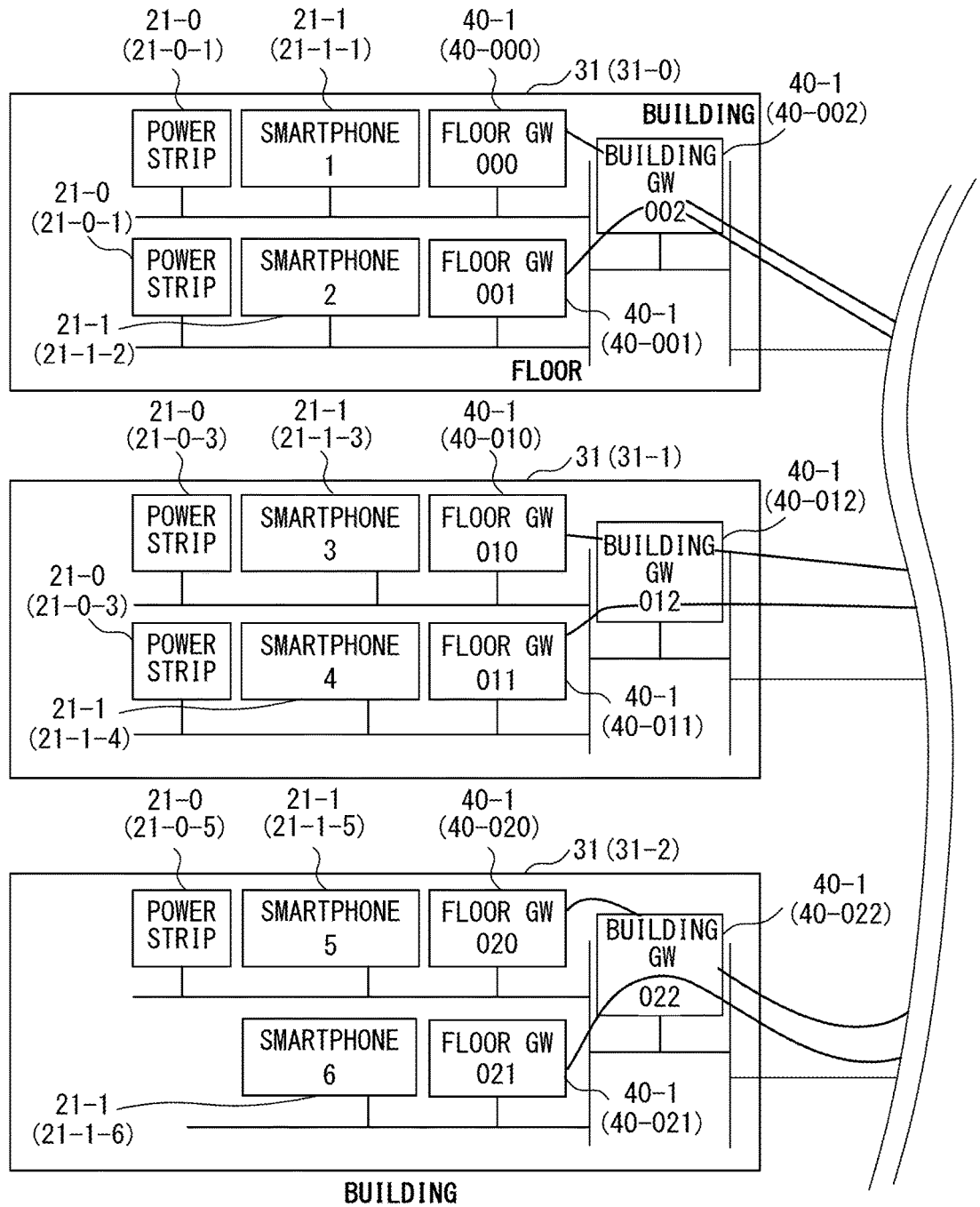
F I G. 3 A

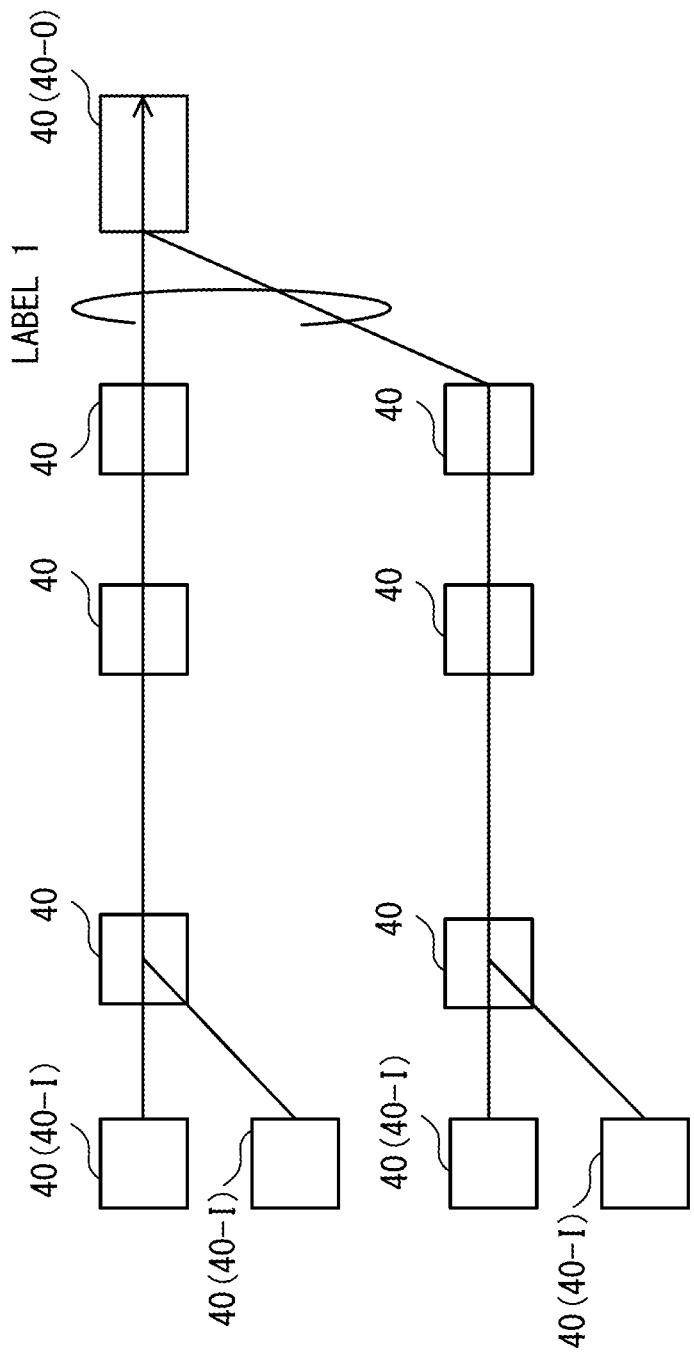
F I G. 4

| URL Path | IDENTIFIER TO BE EXTRACTED | POSITION OF IDENTIFIER |
|---|---|---|
| /xml1 | EventType | /EventType |

| DATA IDENTIFICATION INFORMATION | LABEL |
|---|---|
| EventType =POWER | 1 |
| EventType =SMARTPHONE | 1 |

63a

F I G. 7 B

| LABEL | TRANSFER DESTINATION ADDRESS | ENTRY / HALFWAY / EXIT |
|---|---|---|
| 1 | GW002.com/xml1 | ENTRY |

64a

F I G. 7C

| URL Path | IDENTIFIER TO BE EXTRACTED | POSITION OF IDENTIFIER |
|---|---|---|
| /xml1 | EventType | /EventType |

62a

F I G. 8A

| LABEL | TRANSFER DESTINATION ADDRESS | ENTRY / HALFWAY / EXIT  /64a |
|---|---|---|
| 1 | GW022.com/xml1 | ENTRY |

FIG. 8C

| URL Path | IDENTIFIER TO BE EXTRACTED | POSITION OF IDENTIFIER |
|---|---|---|
| | | |

62a

F I G. 9 A

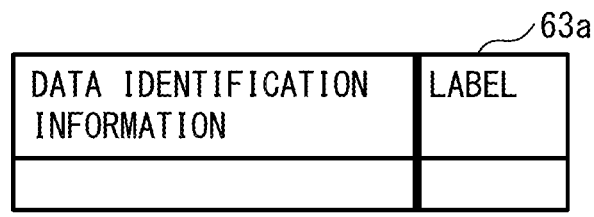
F I G. 9B

| LABEL | TRANSFER DESTINATION ADDRESS | ENTRY / HALFWAY / EXIT  /64a |
|---|---|---|
| 1 | GW030.com/xml1 | HALFWAY |

F I G. 9 C

| DATA IDENTIFICATION INFORMATION | TRANSFER DESTINATION ADDRESS |
|---|---|
|  |  |
|  |  |

65a

F I G. 9 D

| URL Path | IDENTIFIER TO BE EXTRACTED | POSITION OF IDENTIFIER |
|---|---|---|
| /xml1 | EventType | /EventType |

62a

F I G. 1 0 A

| LABEL | TRANSFER DESTINATION ADDRESS | ENTRY / HALFWAY / EXIT |
|---|---|---|
| 1 | Null | EXIT |

64a

F I G. 10 C

| DATA IDENTIFICATION INFORMATION | TRANSFER DESTINATION ADDRESS /65a |
|---|---|
| EventType =POWER | SERVICE APP 1 |
| EventType =SMARTPHONE | SERVICE APP 2 |

F I G. 10D

| GW | IP  /1121 |
|------|-------|
| GW000 | 1.1.1.1 |
| ... | |

| RECEPTION GW / TRANSMISSION GW | GW000 | GW001 | GW002 | GW010 | GW011 | GW012 | ... | GW030 | GW031 | GW032 | GW040 | GW041 |
|---|---|---|---|---|---|---|---|---|---|---|---|---|
| GW000 | 1 | 1 | 1 |  |  |  |  |  |  |  |  |  |
| GW001 | 1 | 1 | 1 |  |  |  |  |  |  |  |  |  |
| GW002 | 1 | 1 | 1 |  |  |  |  |  |  |  |  |  |
| GW010 |  |  |  | 1 | 1 | 1 |  |  |  |  |  |  |
| GW011 |  |  |  | 1 | 1 | 1 |  |  |  |  |  |  |
| GW012 |  |  |  | 1 | 1 | 1 |  |  |  |  |  |  |
| ... |  |  |  |  |  |  |  |  |  |  |  |  |
| GW030 |  |  |  |  |  |  |  | 1 | 1 | 1 | 1 | 1 |
| GW031 |  |  |  |  |  |  |  | 1 | 1 | 1 | 1 | 1 |
| GW032 |  |  |  |  |  |  |  | 1 | 1 | 1 | 1 | 1 |
| GW040 |  |  |  |  |  |  |  | 1 | 1 | 1 | 1 | 1 |
| GW041 |  |  |  |  |  |  |  | 1 | 1 | 1 | 1 | 1 |

1122

|  | 1123 | |
|---|---|---|
| GW_ID | ENTRY GW | EXIT GW |
| GW000 | 1 | |
| GW001 | 1 | |
| GW002 | | |
| GW010 | 1 | |
| GW011 | 1 | |
| GW012 | | |
| ... | | |
| GW030 | | |
| GW031 | | |
| GW032 | | |
| GW040 | | 1 |
| GW041 | | 1 |

F I G. 1 4

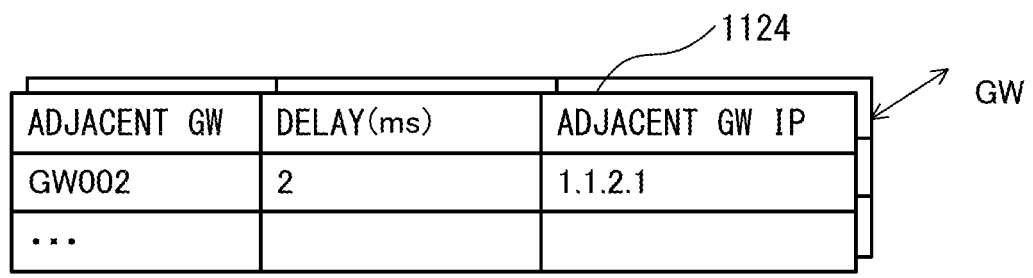
F I G. 15

| LABEL VALUE | IN-USE |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |

1131

F I G. 16

F I G. 17

| EXIT GW | ENTRY GW | TRANSFER PATH | | | |
|---------|----------|---------------|-------|-------|-------|
| GW040   | GW000    | GW000         | GW002 | GW030 | GW040 |
| ...     | ...      |               |       |       |       |
| GW041   | GW000    | GW000         | GW002 | GW030 | GW041 |
| ...     | ...      |               |       |       |       |

1129

| EXIT GW | LABEL | ENTRY GW | TRANSFER PATH | | | |
|---|---|---|---|---|---|---|
| GW040 | 1 | GW000 | GW000 | GW002 | GW030 | GW040 |
| | | ... | | | | |
| GW041 | 2 | GW000 | GW000 | GW002 | GW030 | GW041 |
| | | ... | | | | |

F I G. 1 8

F I G. 19

| APPLIANCE ID | TRANSMISSION EventType | ADDRESS | POSITION OF IDENTIFIER |
|---|---|---|---|
| POWER STRIP 1 | POWER | URL_POWER STRIP1 | /EventType |
| SMARTPHONE 1 | SMARTPHONE | URL_SMARTPHONE1 | /EventType |

1126

| SERVICE APP ID | RECEPTION EventType | ADDRESS |
|---|---|---|
| SERVICE APP 1 | POWER | URL_SERVICE APP1 |
| | SMARTPHONE | |
| SERVICE APP 2 | POWER | URL_SERVICE APP2 |
| | SMARTPHONE | |

FIG. 20

| APPLIANCE ID | ACCOMMODATION DESTINATION GW |
|---|---|
| POWER STRIP 1 | GW000 |
| SMARTPHONE 1 | GW000 |
| | |

| SERVICE APP ID | ACCOMMODATION DESTINATION GW |
|---|---|
| SERVICE APP 1 | GW040 |
| SERVICE APP 2 | GW040 |

1127

F I G. 22

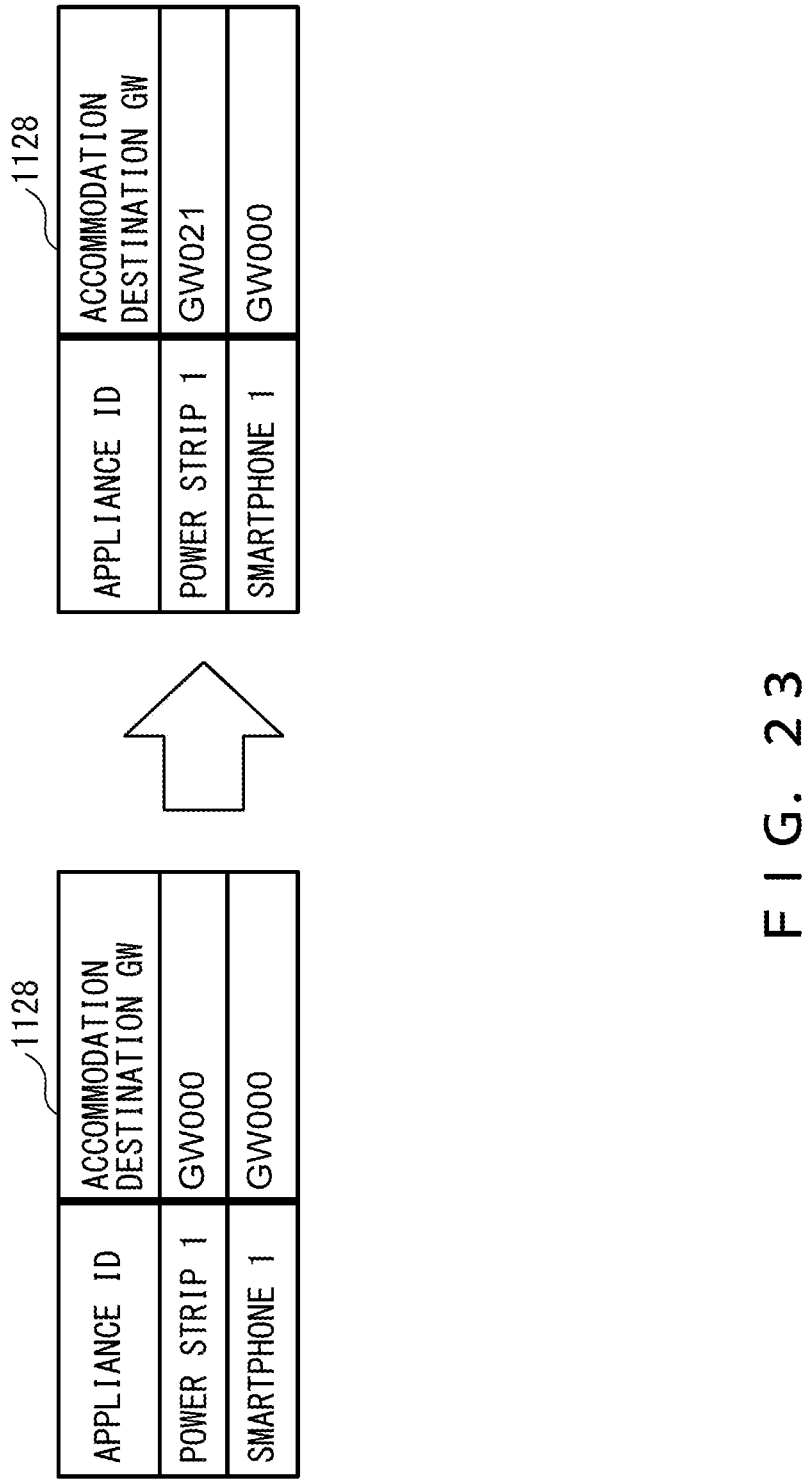
F I G. 2 3

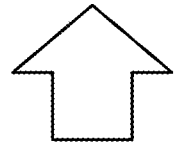
F I G. 24

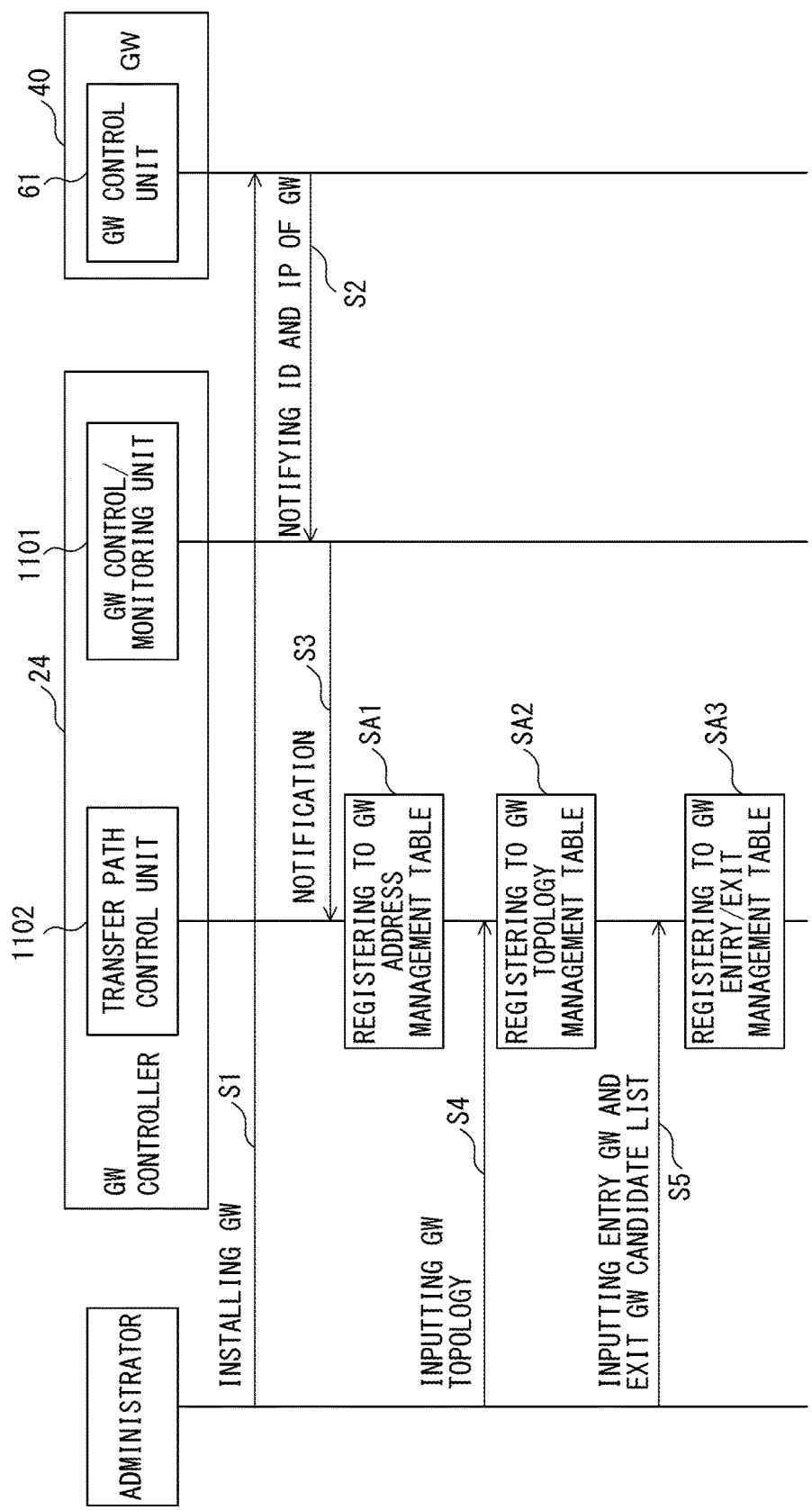
F I G. 25

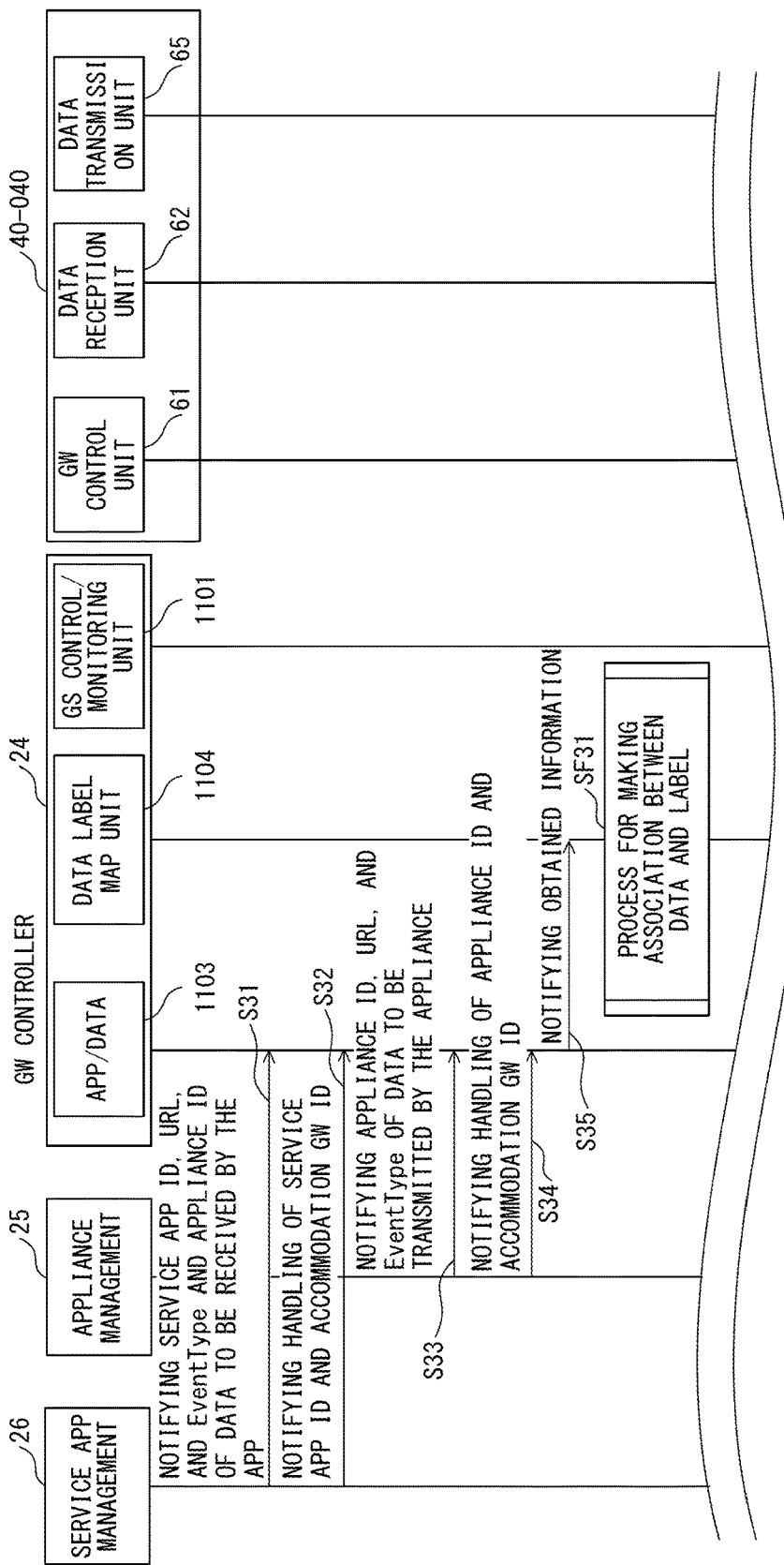
F I G. 28A

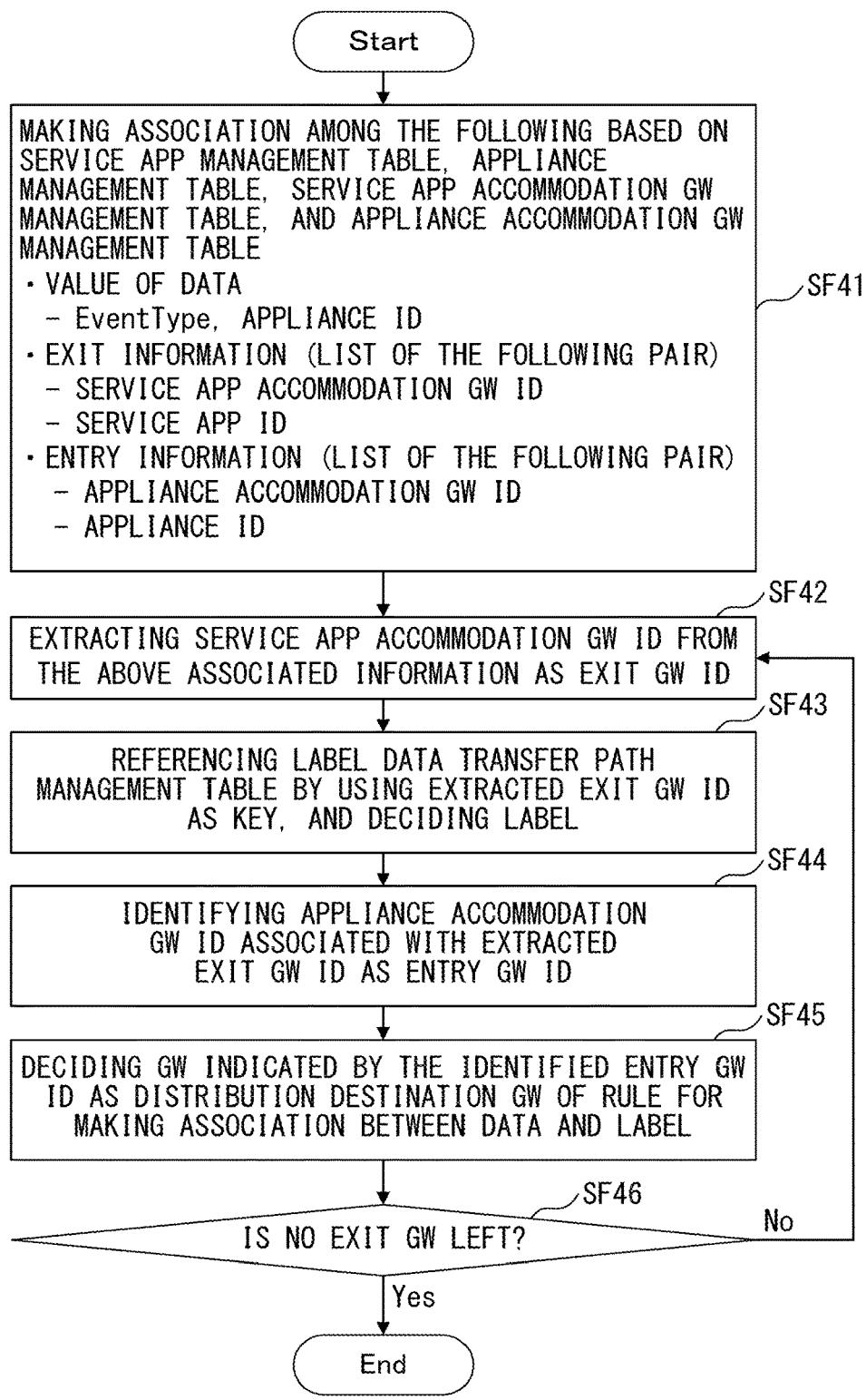
F I G. 29

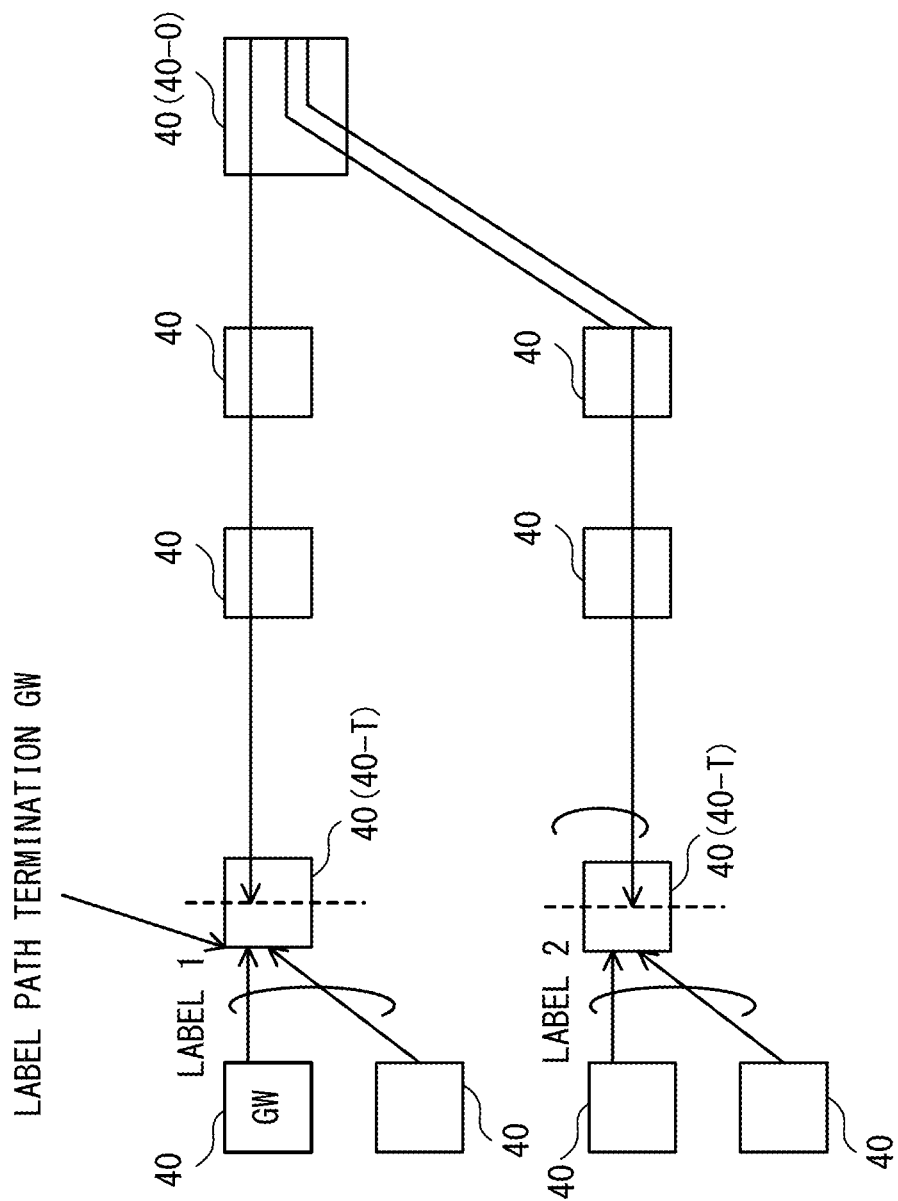
F I G. 3 2

| URL Path | IDENTIFIER TO BE EXTRACTED | POSITION OF IDENTIFIER | LABEL NON-USE FLAG |
|---|---|---|---|
| /xml1 | EventType | /EventType | 1 |

62a

F I G. 3 3 A

F I G. 33B

| LABEL | TRANSFER DESTINATION ADDRESS | ENTRY/HALFWAY/EXIT |
|---|---|---|
| 1 | Null | EXIT |

| DATA IDENTIFICATION INFORMATION | TRANSFER DESTINATION /65a |
|---|---|
| EventType =POWER | GW040.com/xml1 |
| EventType =SMARTPHONE | GW040.com/xml1 |

FIG. 33D

| URL Path | IDENTIFIER TO BE EXTRACTED | POSITION OF IDENTIFIER | LABEL NON-USE FLAG 62a |
|---|---|---|---|
| /xml1 | EventType | /EventType | 1 |

F I G. 3 4 A

F I G. 3 4 B

| LABEL | TRANSFER DESTINATION ADDRESS | ENTRY/HALFWAY/ EXIT /64a |
|---|---|---|
|  |  |  |

F I G. 34C

| DATA IDENTIFICATION INFORMATION | TRANSFER DESTINATION ADDRESS /65a |
|---|---|
| EventType<br>=POWER | URL_SERVICE APP 1 |
| EventType<br>=SMARTPHONE | URL_SERVICE APP 2 |

FIG. 34D

| GW_ID | ENTRY GW | TERMINATION GW | EXIT GW |
|---|---|---|---|
| GW000 | 1 | | |
| GW001 | 1 | | |
| GW002 | | | |
| GW010 | 1 | | |
| GW011 | 1 | | |
| GW012 | | | |
| ... | | | |
| GW030 | | 1 | |
| GW031 | | 1 | |
| GW032 | | 1 | |
| GW040 | | | 1 |
| GW041 | | | 1 |

F I G. 3 5

| LABEL PATH TERMINATION GW | LABEL | ENTRY GW | TRANSFER PATH | | | |
|---|---|---|---|---|---|---|
| GW030 | 1 | GW000 | GW000 | GW002 | GW030 | GW040 |
| | | GW001 | GW001 | GW002 | GW030 | GW040 |
| | | GW000 | GW000 | GW002 | GW030 | GW041 |
| | | GW001 | GW001 | GW002 | GW030 | GW041 |
| ... | | | | | | |

F I G. 36

DATA TRANSFER CONTROL METHOD, RELAY DEVICE, AND DATA TRANSFER CONTROL DEVICE

CROSS-REFERENCE TO RELATED APPLICATION

This application is based upon and claims the benefit of priority of the prior Japanese Patent Application No. JP2013-058609, filed on Mar. 21, 2013, the entire contents of which are incorporated herein by reference.

FIELD

The embodiments discussed herein are related to a technique for controlling a data transfer between each sensor and a data processing server that receives data from each sensor.

BACKGROUND

M2M (Machine-To-Machine) for transmitting and receiving data between machines (including a server) via a network and for autonomously performing an enhanced control or operations is currently being standardized. Moreover, with a huge data group called big data, it is expected, for example, to achieve findings useful for business or a society, and to implement a new mechanism or a system. Thus, the demand for collecting, via a network, data measured or obtained by various sensors present in fields such as a power meter, a gas meter, an electric sensor (a television, an air conditioner, or the like), a surveillance camera, a working machine, a vending machine, and the like has been increasing.

FIG. 1 is an explanatory diagram of a conventional data transfer method. The conventional data transfer method illustrated in FIG. 1 is an example of a case where a plurality of buildings 1 (1-0 to 1-n) are assumed to be a field and data measured or obtained by sensors 15 present in the field are collected. Two data centers (DCs) 3 (3-0, 3-1) are used to collect data. Actual data collection and storage are performed by servers 31 installed within the data centers 3.

In the servers 31, a service application program (SA. Hereinafter abbreviated to "service app") for executing a process such as an analysis or the like of the collected data is executed. SA1 to SA3 illustrated in FIG. 1 respectively represent service apps of different types. Actual data collection and saving are performed by the buildings 31 installed within the data centers 3. The three servers 31-0 to 31-2 that execute different service apps basically collect only target data.

In each of the buildings 1, a gateway (GW) 11 for relaying data inside and outside the local building 1 is installed, and a GW 16 is installed also on each floor 10. A WAN (Wide Area Network) 2 is built between each of the buildings 1 and each of the DCs 3. In the WAN 2, a plurality of GWs 21 having a different responsible area are placed. FIG. 1 illustrates only two GWs such as a GW 21-0 responsible for an area A, and a GW 21-1 responsible for an area B.

Also in each of the DCs 3, one or more GWs 32 for externally relaying data are installed. FIG. 1 illustrates two GWs 32-0 and 32-1 in the DC 3-0, and one GW 32-2 in the DC 3-1.

In the above described system configuration, data transmitted from the sensor 15 present within each of the buildings 1 is transferred to the server 31 via a transfer path from the GW 16 with which the sensor 15 can communicate, to the GW 11, to one or more GWs 21 in the WAN 2, and to the GW 32 within the DC 3. In FIG. 1, a transfer destination of the data transmitted from the sensor 15 is the server 31-0. Numbers 1 to 4 used in "GW1" to "GW4" illustrated in FIG. 1 represent an order where data is transferred among the GW 16, the GW 11-n, the GW 21-1, and the WAN 32-0 when the data is transmitted from the sensor 15 present in the building 1-n.

The above described data transfer is implemented in a way such that the GWs 16, 11, 21, and 32 respectively reference transfer tables 16A, 11A, 21A, and 32A. The transfer tables 16A, 11A, 21A, and 32A are tables for storing a type of data, and an address (transfer destination address) of a transfer destination of the data for each entry (record). Contents of each entry are set by the GW controller 4. The transfer destination having a transfer destination address is a GW or a server 31. Data of "power" depicted as an example of the type of data is data that represents power consumption measured by an electric sensor, or a sensor such as a power strip, or the like.

Each of the sensors 15 stores identification information that indicates a type of data in a body of a message in addition to the data to be transmitted so that the data can be transferred by referencing the transfer tables 16A, 11A, 21A, and 32A (FIG. 5). A GW that receives the message identifies the type of the data by referencing the body of the received message, and transfers the message to a transfer destination specified by the transfer table. As a result, each of the buildings 31 can collect data of a target type.

The sensors 15 are not limited those fixed within a field. Many sensors 15 are movable. For example, a power strip that can measure power consumption can be easily moved. Accordingly, it is preferable to assume a move of the sensors 15.

With the move of the sensors 15, a transfer path of data sometimes varies. For example, when the sensor 15 moves from the building 1-0 to the building 1-n as illustrated in FIG. 1, data transmitted from the sensor 15 is received by the GW 16 that is installed on a floor 10 of the building 1-n. In this case, the data transmitted from the sensor 15 cannot be transferred to the server 31-0 if an entry corresponding to the sensor 15 is not present in the transfer table 16A of the GW 16. This transfer cannot be performed if the entry corresponding to the sensor 15 is not present in the transfer tables 11A and 21A respectively referenced by the GW 11-n and the GW 21-1.

A transfer path is decided according to the position of the sensor 15 and the type of data transmitted by the sensor 15. The transfer table of each GW is set according to a decision result of the transfer path. Accordingly, when the sensor 15 is moved to a position at which a communication is performed with a GW that does not have an entry needed in the transfer table, it is general to change a setting for adding an entry also to transfer tables of GWs other than the GW. In the example illustrated in FIG. 1, it is needed to change settings of the transfer tables of the GW 16, the GW 11-n, and the GW 21-1 in the building 1-n when the sensor 15 is moved from the building 1-0 to the building 1-n. Therefore, if times t1 to t3 are respectively needed to change the settings of the transfer tables of the GW 16, the GW 11-n, and the GW 21-1, the length of time needed to change the settings of all the transfer tables results in t1+t2+t3 or longer. A GW for which the setting of the transfer table needs to be changed is identified according to a move destination of the sensor 15. Accordingly, it is difficult to quickly cope with a move of the sensor 15 to a site at which data transmitted by the sensor 15 cannot be suitably transferred. To collect a lot more data from the sensors 15, it is also important to enable a faster change of the setting of a transfer destination of data to GWs positioned from the sensors 15 to an information management server (service app) in the DC, which desires to collect data, when the sensor 15 moves within the building.

[Patent Document 1] Japanese Laid-open Patent Publication No. 2000-138711

SUMMARY

According to an aspect of the embodiments, a data transfer control method in a system where a plurality of relay devices that relay a data transfer are arranged between a plurality of sensors and one or more data processing servers includes: partitioning a transfer path between a first sensor and a first data processing server into at least a first transfer path, which is a transfer path between the first sensor and a first relay device that initially receives data transmitted from the first sensor, a second transfer path, which is a transfer path from the first relay device to a second relay device that transfers the data transmitted from the first sensor to the first data processing server, and a third transfer path, which is a transfer path between the second relay device and the first data processing server; and implementing a data transfer between each of the sensors and the data processing server by respectively controlling a pair of the first transfer path and the second transfer path, and a pair of the second transfer path and the third transfer path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of a conventional data transfer method;

FIGS. 3A and 3B are explanatory diagram of an actual configuration example of the data collection system employing the data transfer control device and the relay device according to the embodiment;

FIG. 4 is an explanatory diagram of an example of a management method of a data transfer path in this embodiment;

FIG. 7A is an explanatory diagram of an example of contents of an identifier extraction table stored in a GW 40-000;

FIG. 7B is an explanatory diagram of an example of contents of a data distinction table stored in the GW 40-000;

FIG. 7C is an explanatory diagram of an example of contents of a label transfer table stored in the GW 40-000;

FIG. 8A is an explanatory diagram of an example of contents of an identifier extraction table stored in a GW 40-021;

FIG. 8C is an explanatory diagram of an example of contents of a label transfer table stored in the GW 40-021;

FIG. 9A is an explanatory diagram of an example of contents of an identifier extraction table stored in a GW 40-002;

FIG. 9B is an explanatory diagram of an example of contents of a data distinction table stored in the GW 40-002;

FIG. 9C is an explanatory diagram of an example of contents of a label transfer table stored in the GW 40-002;

FIG. 9D is an explanatory diagram of an example of contents of an exit distribution table stored in the GW 40-002;

FIG. 10A is an explanatory diagram of an example of contents of an identifier extraction table stored in a GW 40-040;

FIG. 10C is an explanatory diagram of an example of contents of a label transfer table stored in the GW 40-040;

FIG. 10D is an explanatory diagram of an example of contents of an exit distribution table stored in the GW 40-040;

FIG. 12 is an explanatory diagram of a configuration example of a GW address management table;

FIG. 13 is an explanatory diagram of a configuration example of a GW topology management table;

FIG. 14 is an explanatory diagram of a configuration example of a GW entry/exit management table;

FIG. 15 is an explanatory diagram of a configuration example of an inter-GW link state management table;

FIG. 16 is an explanatory diagram of a configuration example of an empty label value management table;

FIG. 17 is an explanatory diagram of a configuration example of a data transfer path management table;

FIG. 18 is an explanatory diagram of a configuration example of a label data transfer path management table;

FIG. 19 is an explanatory diagram of a configuration example of a sensor management table;

FIG. 20 is an explanatory diagram of a configuration example of a service app management table;

FIG. 21 is an explanatory diagram of a configuration example of a sensor accommodation GW management table;

FIG. 22 is an explanatory diagram of a configuration example of a service app accommodation GW management table;

FIG. 23 is an explanatory diagram of an update of the sensor accommodation GW management table, which is performed when a power strip moves;

FIG. 24 is an explanatory diagram of an update of the data distinction table, which is performed when a power strip moves;

FIG. 25 is a sequence diagram illustrating a flow of processes respectively executed by a GW controller and a GW in order to support an administrator involved in an installation of a GW when the GW is installed;

FIGS. 28A and 28B are sequence diagram illustrating a flow of processes executed by a GW controller and each GW when an association is made between data and a label path;

FIG. 29 is a flowchart illustrating a process for making an association between data and a label;

FIG. 32 is an explanatory diagram of an example of a management method of a data transfer path enabled in a further embodiment;

FIG. 33A is an explanatory diagram of an example of contents of an identifier extraction table stored in a GW 40-030 (further embodiment);

FIG. 33B is an explanatory diagram of an example of contents of a data distinction table stored in the GW 40-030 (further embodiment);

FIG. 33C is an explanatory diagram of an example of contents of a label transfer table stored in the GW 40-030 (further embodiment);

FIG. 33D is an explanatory diagram of an example of contents of an exit distribution table stored in the GW 40-030 (further embodiment);

FIG. 34A is an explanatory diagram of an example of contents of an identifier extraction table stored in a GW 40-040 (further embodiment);

FIG. 34B is an explanatory diagram of an example of contents of a data distinction table stored in the GW 40-040 (further embodiment);

FIG. 34C is an explanatory diagram of an example of contents of a label transfer table stored in the GW 40-040 (further embodiment);

FIG. 34D is an explanatory diagram of an example of contents of an exit distribution table stored in the GW 40-040 (further embodiment);

FIG. 35 is an explanatory diagram of a configuration example of a GW entry/exit management table (further embodiment);

FIG. 36 is an explanatory diagram of a configuration example of a label data transfer path management table (further embodiment)

DESCRIPTION OF EMBODIMENTS

Embodiments are described in detail below with reference to the drawings.

Figure 2:
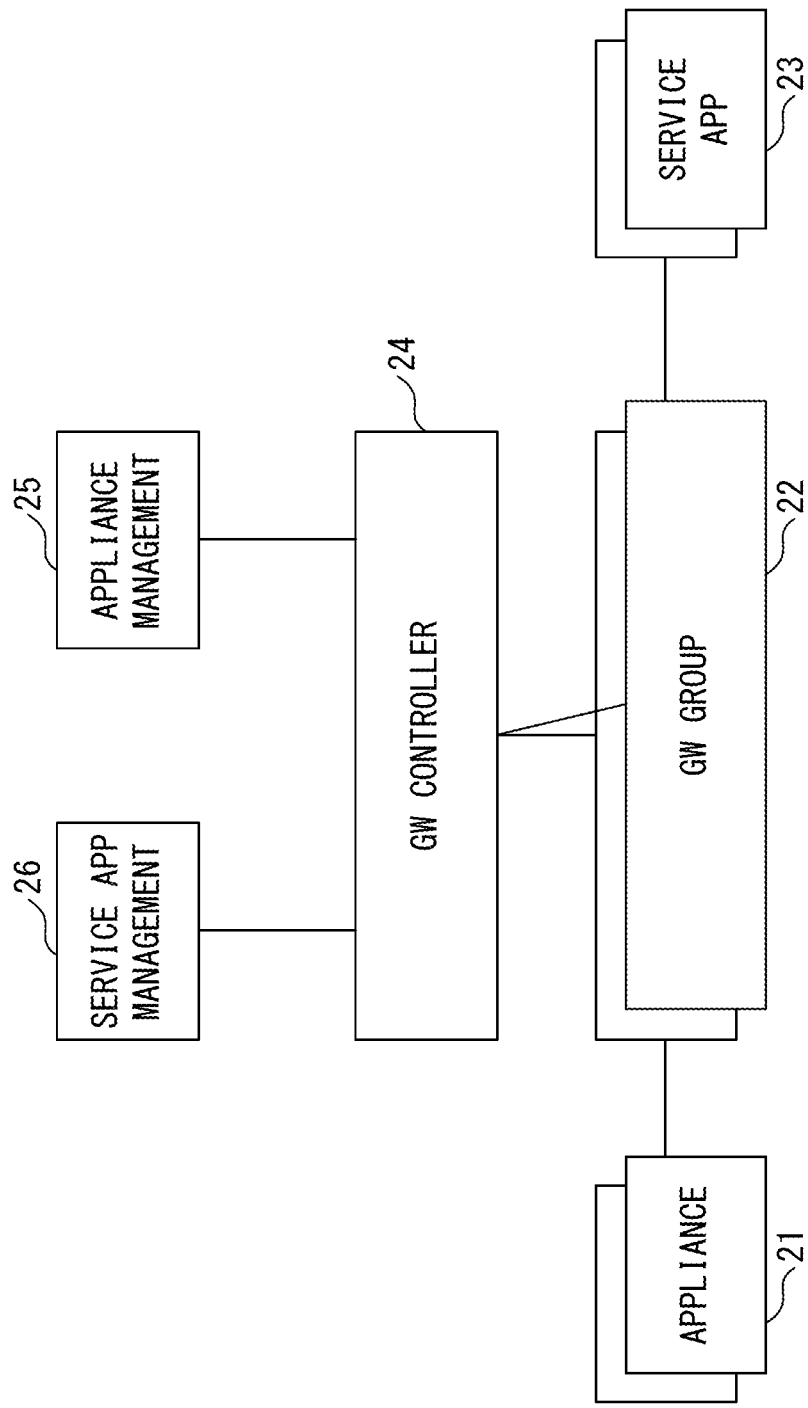
FIG. 2 is an explanatory diagram of an entire configuration example of a data collection system employing a data transfer control device and a relay device according to an embodiment.

FIG. 2 is an explanatory diagram of an entire configuration example of a data collection system employing a data transfer control device and a relay device according to an embodiment.

The configuration example illustrated in FIG. 2 is a configuration where any of servers (data processing servers) 23 that execute a service app of a process for analyzing data transmitted by sensors 21 present in a field collect the data. A GW group 22, which is an aggregate of relay devices for relaying transferred data, is placed between any of the sensors 21 and any of the servers 23. The GW group 22 provides a transfer path between each of the sensors 21 and each of the servers 23. The GW controller 24 is a data transfer control device according to the embodiment. The GW controller 24 controls the GW group 22, and implements a suitable data transfer from each of the sensors 21 to any of the servers 23. GWs that configure the GW group 22 are relay devices according to the embodiment.

The GW controller 24 controls the GW group 22 by a request issued from a sensor management terminal device 25 or a service app management terminal device 26. In FIG. 2, the sensor management terminal device 25 and the service app management terminal device 26 are represented as separate terminal devices for the sake of convenience of an explanation. However, the sensor management terminal device 25 and the service app management terminal device 26 may be the same terminal device.

The sensor management terminal device 25 is a terminal device used to cope with, for example, a placement of the sensor 21 in a field, or a move of the sensor 21 already present in the field. Here, also management for placing each of the GWs that configure the GW group 22 is assumed to be made by using the sensor management terminal device 25.

Data transmitted from the sensor 21 is transferred to any of the servers 23. Types of data to be respectively collected by the servers 23, or types of the sensors 21 that transmit data to be collected vary depending on a type of a service app to be executed. The service app management terminal device 26 is used to manage data to be respectively collected by the servers 23.

Figure 3B:
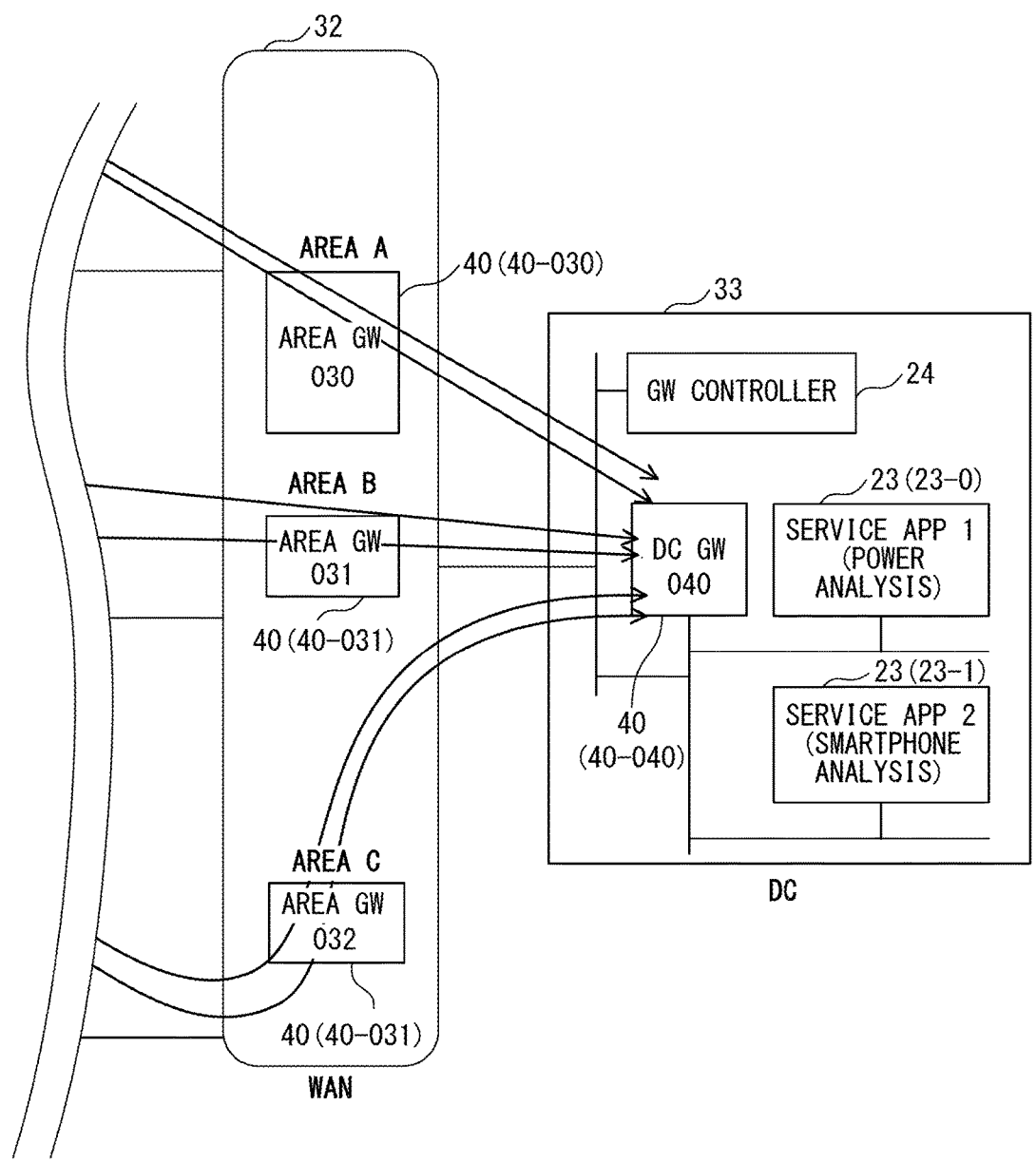

FIGS. 3A and 3B are explanatory diagram of an actual configuration example of the data collection system employing the data transfer control device and the relay device according to the embodiment. FIGS. 3A and 3B only illustrate three buildings 31 (31-0 to 31-2) as a field where the sensors 21 are present, and only two servers 23 (23-0, 23-1) placed in the DC 33 as a transfer destination of data transmitted from the sensors 21.

In each of the buildings 31, a GW 40 is placed to relay data to an outside of the building 31, and a GW 40 is installed on each floor. The GW 40 installed on each floor and the GW 40 that relays data to the outside of the building 31 are hereinafter referred to respectively as a "floor GW" and a "building GW" in order to avoid confusion.

In each of the buildings 31, power strips 21-0 (21-0-1 to 21-0-5) and smartphones 21-1 (21-1-1 to 21-1-6) are placed as the sensors 21. On each of the floors of each of the buildings 31, a plurality of power strips 21-0 and a plurality of smartphones 21-1 are present except for the floor on which the floor GW 40-021 of the building 31-2 is placed. On the floor on which the GW 40-021 of the building 31-2 is present, only the smartphone 21-1 is present.

Each of the power strips 21-0 is a sensor for transmitting data that represents a measured amount of power by measuring the amount of power supplied from, for example, a connected outlet. Each of the smartphones 21-1 is a sensor that transmits data, for example, according to an application program (hereinafter referred to as app) to be executed. The data is, for example, data that represents content of an operation. The data is transmitted and received by both the power strips 21-0 and the GW 21-1, for example, wirelessly.

In the DC 33, the GW controller 24 is placed in addition to a GW 40 and the two servers 23. The GW 40 placed in the DC 33 is hereinafter referred to as a "DCGW". Here, a transfer destination of data transmitted from the power strips 21-0 is assumed to be the server 23-0 and that of data transmitted from the GWs 21-1 is assumed to be the server 23-1.

The WAN 32 connects between each of the buildings 31 and the DC 33. FIGS. 3A and 3B only illustrate the three GWs 40 respectively installed in the areas A to C as the GWs 40 that configure the WAN 32. These GWs 40 are hereinafter referred to as "area GWs".

The GW group 22 illustrated in FIG. 2 is an aggregate of all the GWs 40 illustrated in FIGS. 3A and 3B. Both the sensor management terminal device 25 and the service app management terminal device 26 are placed, for example, within the DC 33 although they are not illustrated in FIGS. 3A and 3B.

FIG. 4 is an explanatory diagram of an example of a management method of a data transfer path in this embodiment. In FIG. 4, a GW 40-I is a GW (hereinafter referred to an entry GW) that initially receives data transmitted from the sensor 21, and a GW 40-O is a GW (hereinafter referred to as an exit GW) positioned immediately before the server 23. Other GWs 40 are GWs positioned between any of the entry GWs 40-I and the exit GW 40-O. In the configuration illustrated in FIGS. 3A and 3B, each floor GW 40 is an entry GW 40-I, whereas the DCGW 40-040 is an exit GW 40-O.

In this embodiment, a transfer path extending from the entry GW 40-I to the exit GW-O is identified, and the identified transfer path is managed regardless of a type of data, a type of the sensor 21, and the like. The identified transfer path is integrated for each entry GW 40-O, and a label value, which is identification information of a transfer path, is assigned. "label 1" illustrated in FIG. 4 represents that a label value is 1. A transfer path to which a label value is assigned is hereinafter referred to as a "label path".

The label path is used to control a data transfer in each of the GWs 40 except for the exit GW 40-O. With the label path, a transfer path of data from each entry GW 40-I to the exit GW 40-O is secured in advance. Accordingly, when a sensor 21 that transmits data, which has not been targeted so far, is newly added, this addition can be handled by making a setting in the entry GW 40-I that receives data from the sensor 21. This can be implemented since it is sufficient to only specify a label path used to transfer the data transmitted from the newly added sensor 21. Thus, the newly added sensor 21 can be quickly handled.

In the configuration illustrated in FIGS. 3A and 3B, no power strips 21-0 are present on the floor where the floor GW 40-021 of the building 31-2 is placed. Accordingly, a setting for suitably transferring the data transmitted from the power strips 21-0 is not normally present on the floor GW 40-021. However, even if a power strip 21-0 is newly placed, it is sufficient to make a setting for specifying a label path used to transfer data transmitted from the power strip 21-0 in the floor GW 40-021.

With this setting, the data transmitted from the power strip 21-0 can be transferred via a label path that uses the floor GW 40-021 as an entry GW 40-I, and a GW 40 positioned immediately before the server 23 to which the data is to be transferred as an exit GW 40-O. The exit GW 40-O identifies the server 23, which is a transfer destination, according to a type of the transferred data, or a type of the sensor 21 that has transmitted the data, and transmits the data to the identified server 23. In this way, the newly added sensor 21 can be handled by making the setting for the entry GW 40-I.

Figure 5:
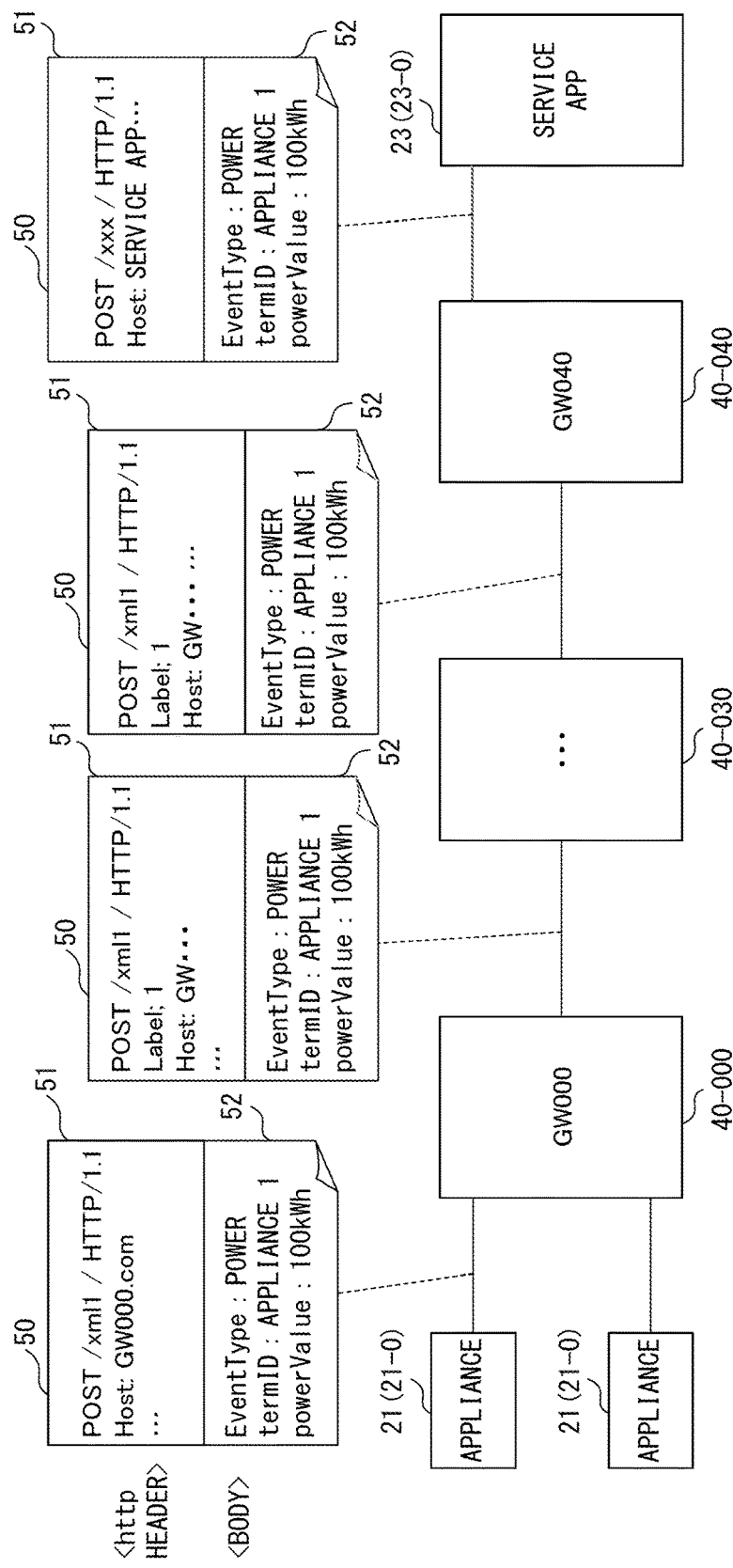
FIG. 5 is an explanatory diagram of a mechanism for implementing a data transfer using a label path.

FIG. 5 is an explanatory diagram of a mechanism for implementing a data transfer using a label path. The sensor 21 transmits data in the form of a packet. The packet includes a header and a body. Data to be transmitted is stored within the body. Here, the data is written by using XML (Extensible Markup language) so that the meaning of the data can be recognized.

50 illustrated in FIG. 5 is an HTTP (HyperText Transfer Protocol) message (hereinafter referred to as a "message") obtained as a result of assembling one or more packets. To avoid confusion, data transmitted and received between the sensor 21 and the server 23 is hereinafter referred to as a "message" that represents the whole of the data. Unless otherwise noted, a packet is used to represent data that is not transmitted and received between the sensor 21 and the server 23.

In FIG. 5, "EventType", "TermID", and "PowerValue" respectively represent a tag name.

"EventType" is a tag that specifies a type of data. "power" denoted as the content of the tag indicates that the type of data is power. "TermID" is a tag that specifies a type of the sensor 21. "sensor 1" denoted as the content of the tag indicates that the type of the sensor 21 is the power strip 21-0. "PowerValue" is a tag that specifies actual data. "100 kWh" denoted as the content of the tag indicates that power consumption per hour is 100 kW. If the sensor 21 is the smartphone 21-1, "smartphone" is written as the content of "EventType".

The entry GW 40-I and the exit GW 40-O reference content of at least one of elements of "EventType" and "TermID", which are stored in the body 52. Here, the referenced element is assumed to be only "EventType".

The entry GW 40-I identifies a label path to be used to transfer the message 50 based on the content of the element of "EventType", and stores identification information that indicates the identified label path in a header 51. Thus, the other GWs 40 except for the exit GW 40-O on the label path transfer the message 50 according to the identification information stored in the header 51. As a result, the message 50 is transferred up to the exit GW 40-O of the label path indicated by the identification information. The identification information is denoted as "Label; 1" in FIG. 5.

The other GWs 40 except for the exit GW 40-O on the label path rewrite a URL (Uniform Resource Locator) stored in the header 51 according to the label path indicated by the identification information. By rewriting the URL, the message 50 is transferred along the label path. In FIG. 5, the URL is represented by a character string succeeding "Host:", and that succeeding "POST". For example, a character string "GW000.com" succeeding "Host:" indicates the name of the GW 40-000, which is a transmission destination. The name is hereinafter referred to as a "destination address". "/xml1", which is a character string succeeding "POST", indicates a path name in the GW 40-000, which is the transmission destination.

Only the exit GW 40-O rewrites this path name as illustrated in FIG. 5. In this embodiment, this path name is used also as information for identifying a tag to be referenced within the body 52.

The exit GW 40-O deletes the identification information within the header 51, and changes a transmission destination address of the header 51 to an address of the server 23 identified based on the content of the element of "EventType". The path name is deleted or changed to that set in the identified server 23. Here, the path name is assumed to be deleted. With such a URL change, the message 50 transmitted from the exit GW 40-O is received by the server 23 that is to receive the message 50. "/xxx" illustrated in FIG. 5 indicates that the path name is deleted.

The GW controller 24 controls each of the GWs 40 so that the transfer of the message 50, which is illustrated in FIG. 5, is performed. Prior to an explanation of details of the GW controller 24, a GW 40 is described in detail.

The label path management illustrated in FIG. 4, and the data transfer control illustrated in FIG. 5 are also performed in a data transmission from each of the servers 23 to each of the sensors 21. However, contents of the data transmission are basically the same as those in a case where a data transmission is made from each of the sensors 21 to each of the servers 23. Thus, the explanation is provided here by assuming only the data (the message 50) transmitted from each of the sensors 21 for the sake of convenience.

Figure 6:
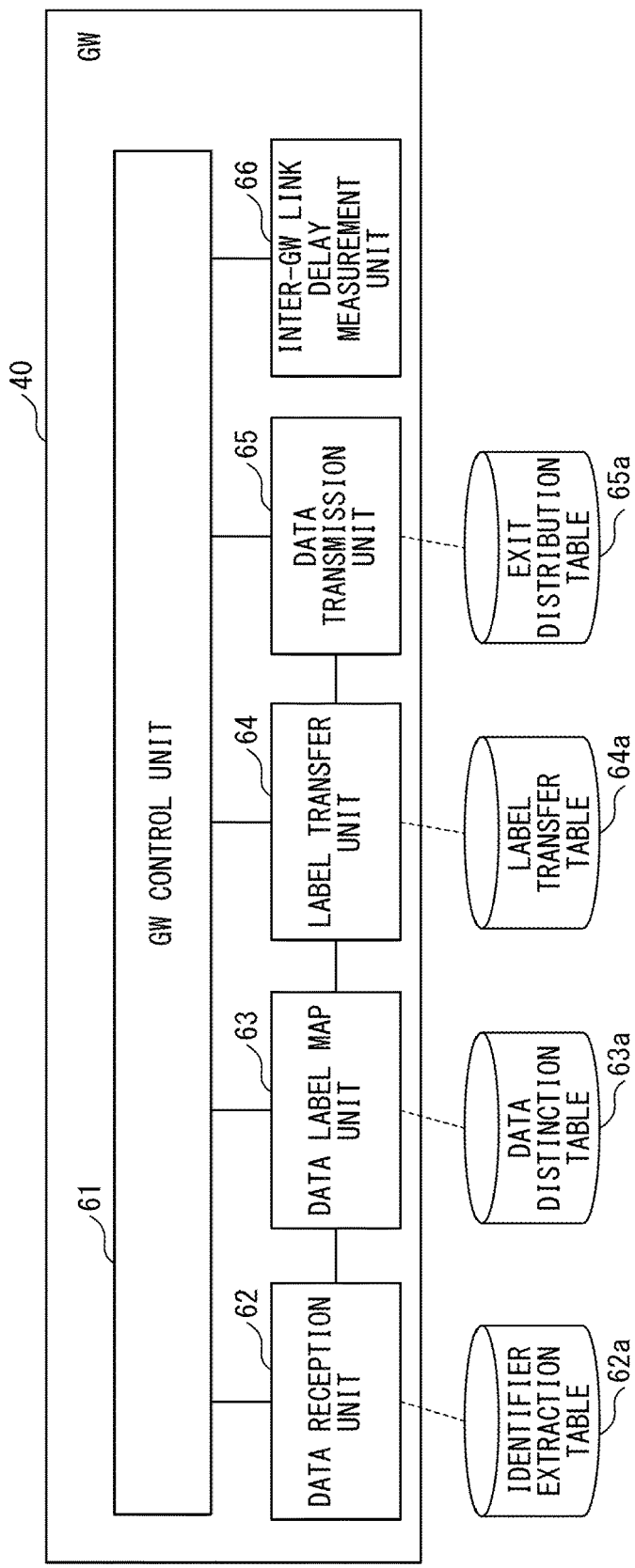
FIG. 6 illustrates a configuration example of function of a GW.

FIG. 6 illustrates a configuration example of functions of a GW. Each GW 40 includes a GW control unit 61, a data reception unit 62, a data label map unit 63, a label transfer unit 64, a data transmission unit 65, and an inter-GW link delay measurement unit 66 as illustrated in FIG. 6. The data reception unit 62 manages an identifier extraction table 62a. Similarly, the data label map unit 63 manages a data distinction table 63a, the label transfer unit 64 manages a label transfer table 64a, and the data transmission unit 65 manages an exit distribution table 65a.

FIGS. 7A to 7D are explanatory diagrams of examples of contents of the tables 62a to 65a stored by a GW 40-000. FIGS. 8A to 8D are explanatory diagrams of examples of contents of the tables 62a to 65a stored by a GW 40-021. FIGS. 9A to 9D are explanatory diagrams of examples of contents of the tables 62a to 65a stored by a GW 40-002. FIGS. 10A to 10D are explanatory diagrams of examples of contents of the tables 62a to 65a stored by a GW 40-040.

The GWs 40 can be broadly classified into an entry GW 40-I, an exit GW 40-O, and other GWs 40 (hereinafter referred to as halfway GWs). Operations of a GW 40 vary depending on whether the GW 40 is an entry GW40-I, an exit GW 40-O, or a halfway GW 40. Also contents stored in the tables 62a to 65a vary depending on whether the GW 40 is an entry GW40-I, an exit GW 40-O, or a halfway GW 40. Based on this, a configuration of functions of the GW 40 is described with reference to FIGS. 7A to 10D.

The data reception unit 62 receives the message 50 addressed to the local GW 40, and extracts contents of a tag to be extracted from the body 52 of the received message 50. The contents of the tag are extracted by referencing the identifier extraction table 62a.

In each entry of the identifier extraction table 62a, for example, URL path information, information of an identifier to be extracted, and position information of the identifier are stored as illustrated in FIG. 7A. The URL path information (depicted as "/xml1" in FIG. 7A) is information that indicates a path name in the GW 40, which is a transmission source, as described above. The information of an identifier to be extracted ("EventType" depicted in FIG. 7A) is information that indicates a tag the contents of which are to be extracted. The position information ("/EventType in FIG. 7A) of the identifier is information that indicates a position at which a target tag is present. For example, Xpath can be adopted. The data reception unit 62 extracts contents of a specified tag from the body 52 by referencing the identifier extraction table 62a with the use of the path name stored in the header 51 of the received message 50 as a key.

Only the entry GW 40-I and the exit GW 40-O may extract the contents of the tag. Accordingly, in the GW 40-021, which is the entry GW 40-I, and the GW 40-040, which is the exit GW 40-O, the identifier extraction table 62a where information is stored in entries is set as illustrated in FIGS. 8A and 10A. However, in the building GW 40-002, which is the halfway GW 40, the identifier extraction table 62 where information are not stored in entries is set as illustrated in FIG. 9A.

The data reception unit 62 outputs the received message 50, and the contents of the tag, which have been extracted from the body 52, to the data label map unit 63. In each entry of the data distinction table 63a referenced by the data label map unit 63, for example, data identification information, and a number of a label path are stored as illustrated in FIG. 7B. The data identification information is information that indicates contents of a tag. Accordingly, the data label map unit 63 extracts the number of the label path used to transfer the message 50 by referencing the data distinction table 63a with the use of the input contents of the tag as a key, and outputs the extracted number of the label path to the label transfer unit 64 along with the message 50 and the contents of the tag.

Figure 8B:
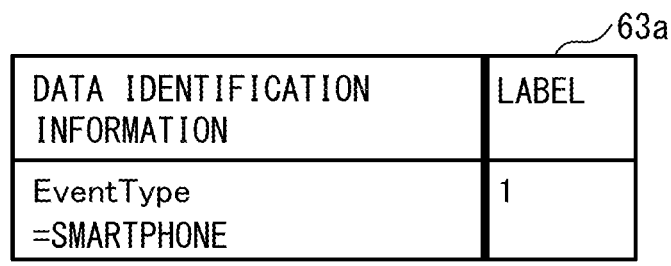
FIG. 8B is an explanatory diagram of an example of contents of a data distinction table stored in the GW 40-021.
Figure 10B:
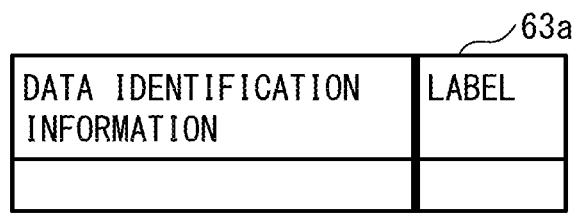
FIG. 10B is an explanatory diagram of an example of contents of a data distinction table stored in the GW 40-040.

Only the entry GW 40-I may extract the number of the label path. Accordingly, in the floor GW 40-021, which is the entry GW 40-I, the data distinction table 63a where information is stored in entries is set as illustrated in FIG. 8B. However, since no smartphones 21-1 are present on the floor where the floor GW 40-021 is placed, the number of entries in which information is stored is only one. In the building GW 40-002, which is not the entry GW 40-I, and the DCGW 40-040, the data distinction table 63a where information is not stored in entries is set as illustrated in FIGS. 9B and 10B.

The label transfer table 64a managed by the label transfer unit 64 is a table for transferring the message 50 to the next transfer destination. In each entry of the label transfer table 64a, a number of a label path, transfer destination address information, and GW placement information ("entry/half-way/exit" in FIG. 7C), which indicates whether the local GW 40 is an entry GW 40-I, an exit GW 40-O, or a halfway GW 40 are stored. The label transfer unit 64 rewrites the header 51 of the message 50 by referencing the label transfer table 64a with the use of the input number of the label path as a key.

All the GWs 40 rewrite the header 51 of the message 50. However, rewritten contents differ depending on GW placement information of the GWs 40. In the entry GW 40-I, a transmission destination address is rewritten, and at the same time, identification information of a label path is written. In the halfway GW 40, only a transmission destination address is rewritten. In the exit GW 40-O, a transmission source address and a URL (a transmission destination address and a path name) are rewritten, and at the same time, identification information of the label path is deleted. The label transfer unit 64 of the exit GW 40-O rewrites the transmission source address, and deletes the identification information of the label path.

"GW002.com/xml1" denoted as the transfer destination address information in FIG. 7 indicates that the building GW 40-002 is a transfer destination. Here, 002 of "GW002" and a numeral string 002 succeeding a hyphen of the reference numeral 40-002 are made to match, so that the GW40 represented by "GW" and the numeral string succeeding the "GW" is clarified. Thus, "GW022.com/xml1" denoted as the transfer destination address information in FIG. 8C indicates that the building GW 40-022 is a transfer destination. Similarly, "GW030.com/xml1" denoted as the transfer destination address information in FIG. 9C indicates that an area GW 40-030 is a transfer destination. "Null" denoted as the transfer destination address information in FIG. 10C represents that a transfer destination along the label path is not present, namely, the local GW 40-O is the exit GW 40-O.

Figure 7D:
FIG. 7D is an explanatory diagram of an example of contents of an exit distribution table stored in the GW 40-000.
Figure 8D:
FIG. 8D is an explanatory diagram of an example of contents of an exit distribution table stored in the GW 40-021.

The label transfer unit 64 outputs the message 50 rewritten the header 51 and the contents of the tag to the data transmission unit 65. In each entry of the exit distribution table 65a referenced by the data transmission unit 65a, data identification information and transfer destination address information are stored as illustrated in FIG. 10D. Only in the DCGW 40-040, which is the exit GW 40-O, the exit distribution table 65a where information is stored in entries is set. As illustrated in FIGS. 7D, 8D, and 9D, no entries where information is stored are present in the exit distribution table 65*a* set in the other GWs 40. Therefore, the data transmission unit 65 of the GW 40, which is not the exit GW 40-O, transmits the message 50 input from the label transfer unit 64 unchanged. The data transmission unit 65 of the exit GW 40-O extracts a transfer destination address from the exit distribution table 65*a* by referencing the exit distribution table 65*a* with the use of the input contents of the tag as a key, and transmits the message 50 to which the extracted destination address has been written as a transmission destination address. Since the transmission destination is not the GW 40, the path name is deleted (denoted as "/xxx" in FIG. 5). Thus, the message 50 transmitted from the power strip 21-0 is finally received by the server 23-0. The message 50 transmitted from the smartphones 21-1 is finally received by the server 23-I.

The GW link delay measurement unit 66 directly communicates with a communicative different GW as a target by using the data transmission unit 65 and the data reception unit 62, and measures the length of time needed from the transmission of a packet to the different GW 40 until a reply is received. The measured length of time is notified to the GW controller 24 for each GW 40 via the data transmission unit 65.

The GW control unit 61 controls the entire GW 40. The GW control unit 61 manages the data reception unit 62, the data label map unit 63, the label transfer unit 64, the data transmission unit 65, and the inter-GW link delay measurement unit 66 so that the GW 40 suitably operates.

Figure 11:
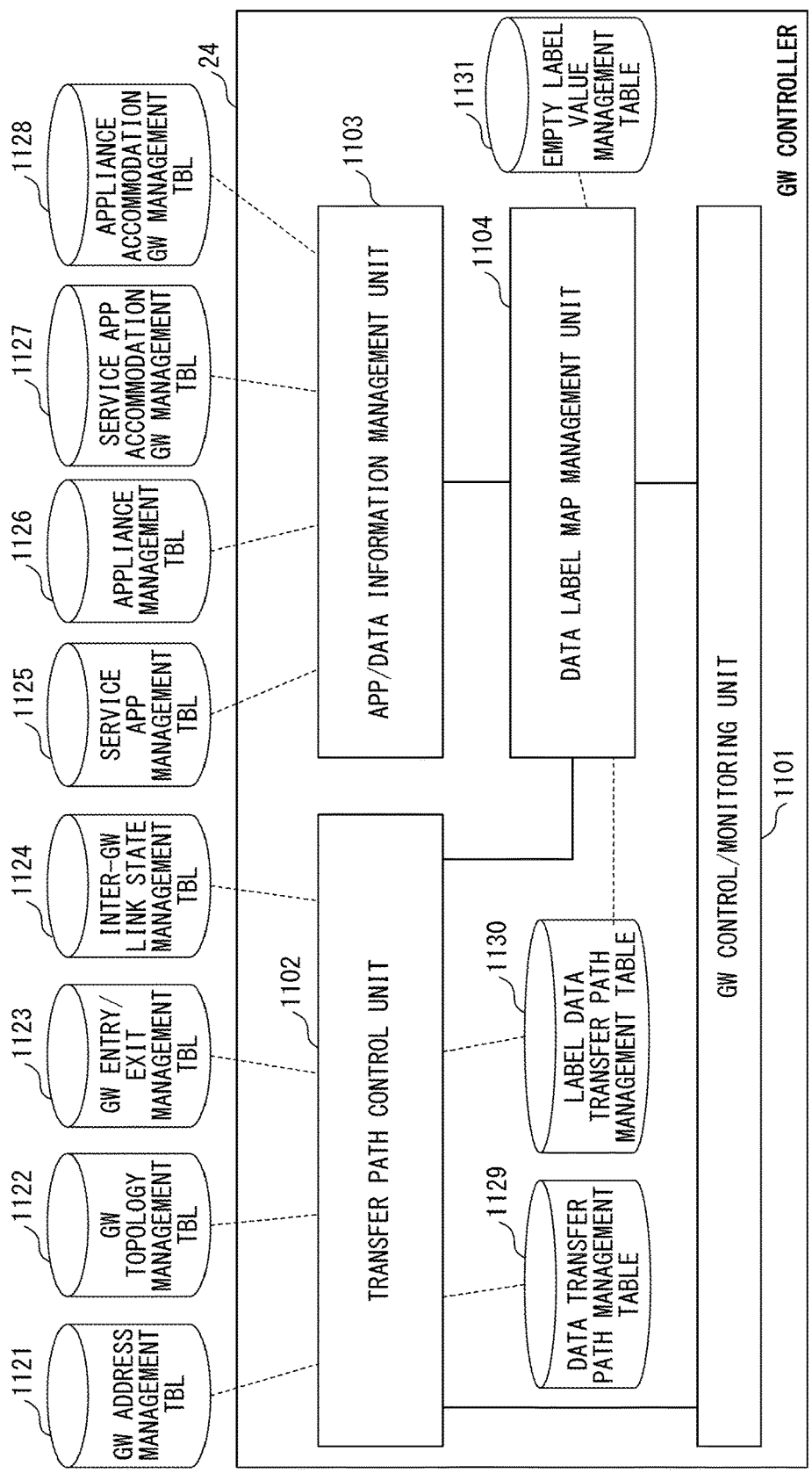
FIG. 11 illustrates a configuration example of functions of a GW controller.

FIG. 11 illustrates a configuration example of functions of the GW controller. As illustrated in FIG. 11, the GW controller 24 includes a GW control/monitoring unit 1101, a transfer path control unit 1102, an app/data information management unit 1103, and a data label map management unit 1104.

The GW control/monitoring unit 1101 communicates with each GW 40, and controls each GW 40 by issuing an instruction including settings of the various types of tables 62*a* to 65*a*.

The transfer path control unit 1102 sets a label path. To do this, the transfer path control unit 1102 manages a GW address management table 1121, a GW topology management table 1122, a GW entry/exit management table 1123, an inter-GW link state management table 1124, a data transfer path management table 1129, and a label data transfer path management table 1130. These various types of tables 1121 to 1124, 1129, and 1130 are as follows. These various types of tables 1121 to 1124, 1129, and 1130 are specifically described with reference to explanatory diagrams illustrated in FIGS. 12 to 15, 17, and 18.

Figure 12:
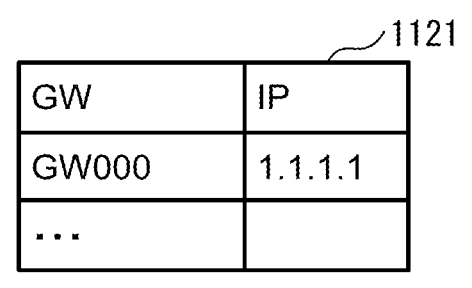

FIG. 12 is an explanatory diagram of a configuration example of the GW address management table. The GW address management table 1121 is a table for managing a GW 40 to be controlled. In each entry of the GW address management table 1121, identification information of a GW 40 and an address (IP (Internet Protocol) address) of the GW 40 are stored as illustrated in FIG. 12. The identification information of the GW 40 is hereinafter referred to as a "GWID (IDentifier)" or "ID".

FIG. 13 is an explanatory diagram of a configuration example of the GW topology management table. In FIG. 13, a "reception GW" is an ID of a GW 40 assumed to receive the message 50, and a "transmission GW" is an ID of a GW 40 assumed to transmit a packet. Notations such as "GW000" and "GW001" and the like respectively indicate the floor GW 40-000 and the floor GW 40-001 as described above.

The GW topology management table 1122 is used to identify a connection relationship among GWs 40. In FIG. 13, a column where "1" is denoted represents a relationship with a GW to and from which a packet can be directly transmitted and received.

FIG. 14 is an explanatory diagram of a configuration example of the GW entry/exit management table. The GW entry/exit management table 1123 is used to identify an entry GW 40-I and an exit GW 40-O. In each entry of the GW entry/exit management table 1123, a GWID, entry GW information indicating whether a GW 40 to which the GWID is assigned is an entry GW 40-I, and exit GW information indicating whether the GW40 to which the GWID is assigned is an exit GW 40-O are stored. "1" denoted as entry GW information indicates that the GW40 to which the GWID is assigned is the entry GW 40-I. Similarly, "1" denoted as the exit GW information indicates that the GW 40 to which the GWID is assigned is the exit GW 40-O.

The entry GW 40-I and the exit GW 40-O vary depending on a transmission source of the message 50. The DCGW 40-040 is the exit GW 40-O when the message 50 transmitted from the sensor 21 is assumed. However, when the message 50 transmitted from the server 23 is assumed, the DCGW 40-040 is not the exit GW 40-O. Therefore, the GW entry/exit management table 1123 is prepared for each transmission source assumed in the message 50.

FIG. 15 is an explanatory diagram of a configuration example of the inter-GW link state management table. There is a possibility that a communication between GWs 40 set to be communicative in the GW topology management table 1122 is not performed. This is because a fault can possibly occur in the GW 04, or a cable, etc. connected to the GW 40. Thus, the inter-GW link state management table 1124 is used to identify GWs 40 between which a communication can be actually performed, and the length of time (delay time) needed for a communication between the GWs 40.

The inter-GW link state management table 1124 is an aggregate of tables prepared for each GW 40, which is, for example, a transmission side. In each entry of the table prepared for each GW 40, an ID (depicted as an "adjacent GW" in FIG. 15) of a communicative GW 40, a delay time (ms), and an IP address of the communicative GW 40 are stored. The communicative GW 40 is hereinafter referred to as an "adjacent GW".

FIG. 17 is an explanatory diagram of a configuration example of the data transfer path management table. The data transfer path management table 1129 is a table for managing a label path between each sensor 21 and each server 23. As illustrated in FIG. 17, in each entry of the data transfer path management table 1129, a GWID that indicates an exit GW 40-O, a GWID that indicates an entry GW 40-I, and path information that indicates a link of GWs40 that configure a label path from the entry GW 40-I to the exit GW 40-O are stored. "GW000", "GW002", "GW003", and "GW004" depicted as path information are GWIDs that indicate a link of the GWs 40.

As illustrated in FIG. 4, the same label value is assigned to label paths having the same exit GW 40-O in this embodiment. Accordingly, in each entry of the data transfer path management table 1129, one or more pairs of a GWID of an entry GW 40-I and path information are stored for one exit GW 40-0.

FIG. 18 is an explanatory diagram of a configuration example of the label data transfer path management table.

The label data transfer path management table 1130 is a table for managing an assignment of a label value to a label path. Accordingly, in each entry of the label data transfer path management table 1130, a label value can be stored in addition to the entry of the data transfer path management table 1129 as illustrated in FIG. 18.

The transfer path control unit 1102 creates the GW topology management table 1122 and the GW entry/exit management table 1123 according to an external instruction. The GW address management table 1121 is created or updated with a communication with a GW 40 to be controlled. The inter-GW link state management table 1124 is created by causing each GW 40 to measure a delay time from a specified GW 40 via the GW control/monitoring unit 1101, and by obtaining a result of the measurement. The GW address management table 1121 is used to specify a GW 40-O or to issue an instruction to each GW 40. The transfer path control unit 1102 creates or updates the data transfer path management table 1129 and the label data transfer path management table 1130 in a situation where the GW address management table 1121, the GW topology management table 1122, the GW entry/exit management table 1123, and the inter-GW link state management table 1124 are present.

The data label map management unit 1104 manages an assignable label value. To do this, the data label map management unit 1104 manages an empty label value management table 1131. In the empty label value management table 1131, entries that the number of which conforms to the number of assignable label values are present. In each entry, a label value and in-use information are stored as illustrated in FIG. 16. "0" denoted as the in-use information indicates that a corresponding label value is not used. If the corresponding label value is used, for example, "1" is stored as the in-use information.

The transfer path control unit 1102 requests the data label map management unit 1104 to assign an unused label value, and to assign the label value to a label path. As a result, an unduplicated label value is assigned to the label path.

The app/data information management unit 1103 manages information about a transfer of the message 50 transmitted from a sensor 21. To manage this information, the app/data information management unit 1103 creates or updates a service app management table 1125, a sensor management table 1126, a service app accommodation GW management table 1127, and a sensor accommodation GW management table 1128. These various types of tables are specifically described with reference to explanatory diagrams illustrated in FIGS. 19 to 22.

FIG. 19 is an explanatory diagram of a configuration example of the sensor management table. The sensor management table 1126 is a table for managing a transfer destination of the message 50 transmitted from a sensor 21 for each type of the sensor 21. In each entry of the sensor management table 1126, identification information ("sensor ID" in FIG. 19) that indicates a type of a sensor 21, content of a tag, address information of the sensor 21, and position information (such as Xpath) of an identifier are stored as illustrated in FIG. 19. "power" and "smartphone", which are depicted as the contents of the tag, indicate information written as the contents of the "EventType" tag as described above. "URL power strip 1" and "URL smartphone 1", which are depicted as an address, respectively indicate the address of the power strip 21-0 and that of the smartphone 21-1.

FIG. 20 is an explanatory diagram of a configuration example of the service app management table. The service app management table 1125 is a table for managing data to be received by each server 23 that executes a service app. In each entry of the service app management table 1125, identification information (depicted as a "service app" in FIG. 20. Hereinafter referred to as a "service app") that indicates a service app executed by the server 23, contents of a tag, and IP address information of the server 23 are stored.

FIG. 21 is an explanatory diagram of a configuration example of the sensor accommodation GW management table. The sensor accommodation GW management table 1128 is a table for managing a GW 40 that directly transmits and receives the message 50 to and from a GW 40 that accommodates each sensor 21, namely, each sensor 21. In each entry of the sensor accommodation GW management table 1128, a sensor ID, and a GWID of an accommodation GW that accommodates the sensor 21 to which the sensor ID is assigned are stored as illustrated in FIG. 21.

FIG. 22 is an explanatory diagram of a configuration example of the service app accommodation GW management table. The service app accommodation GW management table 1127 is a table for managing a GW 40 that directly transmits and receives the message 50 to and from a GW 40 that accommodates each server 23 executing a service app, namely, each server 23. In each entry of the service app accommodation GW management table 1127, a service app ID, and a GWID of an accommodation GW 40 that accommodates the server 23 executing the service app to which the service app ID is assigned are stored as illustrated in FIG. 22. Here, the accommodation GW 40 is an exit GW 40-O.

The app/data information management unit 1103 creates or updates the service app management table 1125, the sensor management table 1126, the service app accommodation GW management table 1127, and the sensor accommodation GW management table 1128 according to an external instruction.

When the sensor accommodation GW management table 1128 is created, it is needed to store the various types of tables 62a to 65a in each GW 40. In this case, for example, the GW control/monitoring unit 1101 sets the identifier extraction table 62a, the data distinction table 63a, the label transfer table 64a, and the exit distribution table 65a in each GW 40 to be controlled. These settings are made by referencing the label data transfer path management table 1130 managed by the transfer path control unit 1102, and the various types of tables 1125 to 1128 managed by the app/data information management unit 1103.

In the meantime, when the sensor accommodation GW management table 1128 is updated, it is needed to update the identifier extraction table 62a and/or the data distinction table 63a of any of the GWs 40 according to contents of the update. Assuming that contents of the same tag are extracted for both the power strip 21-0 and the smartphone 21-1, it is needed to update the data distinction table 63a of any of the GWs 40 as occasion demands. Therefore, in this case, for example, the GW control/monitoring unit 1101 identifies the GW 40 where the data distinction table 63a needs to be updated, and the data distinction table 63a of the identified GW 40 is updated. This update is performed by referencing the label data transfer path management table 1130 managed by the transfer path control unit 1102, and the various types of tables 1125 to 1128 managed by the app/data information management unit 1103.

For example, when the power strip 21-0-1 placed on a floor where the floor GW 40-000 is installed is moved to the floor where the floor GW 40-021 is installed, contents of the sensor accommodation GW management table 1128 are updated with the move as illustrated in FIG. 23. Since no power strips 21-0 are present on the floor where the floor GW 40-021 is installed, an entry for the power strip 21-0 is not present in the data distinction table 63a managed by the floor GW 40-021. Accordingly, the GW control/monitoring unit 1101 updates one entry of the data distinction table 63a managed by the floor GW 40-021 to store information for the power strip 21-0 as illustrated in FIG. 24.

A message transfer from the floor GW 40-021 to the DCGW 40-040 can be performed according to the label transfer table 64a respectively set in the GW 40-022 and the GW 40-032. By updating the data distinction table 63a of one GW 40, an addition of a new sensor 21 resultant from a move of the sensor 21 can be handled, so that the addition can be handled quickly.

Figure 31:
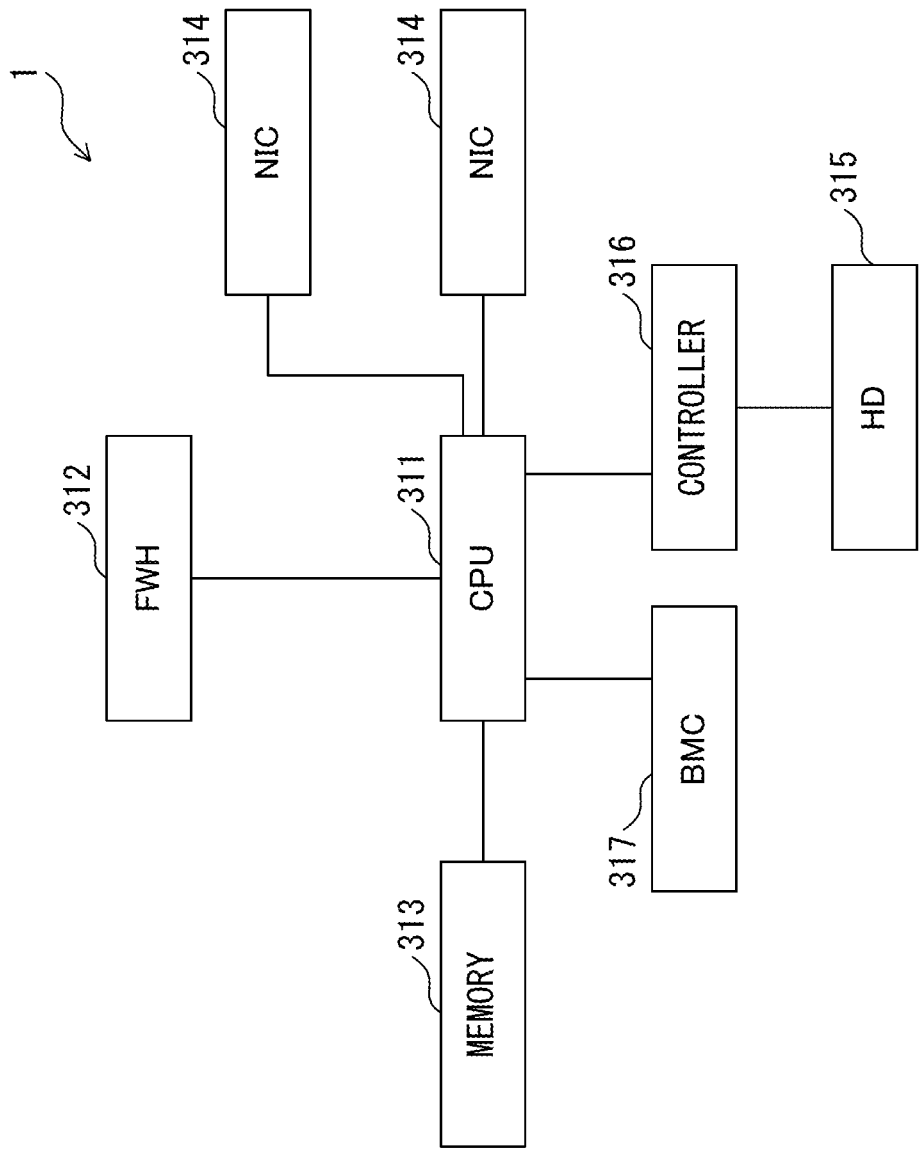
FIG. 31 illustrates a configuration example of a data processing server available as a GW controller and a GW.

FIG. 31 illustrates a configuration example of a data processing server available as the GW controller and the GW. Here, the data processing server available as the GW controller 24, which is a data transfer control device according to this embodiment, and/or the GW 40, which is the relay device according to this embodiment, are specifically described with reference to FIG. 31.

This data processing server includes a CPU (Central Processing Unit) 311, an FWH (Firm-Ware Hub) 312, a memory (memory module) 313, a plurality of NICs (Network Interface Cards) 314, a hard disk device (HD) 315, a controller 316, and a BMC (Baseboard Management Controller) 317. This configuration is merely one example, and the configuration of the data processing server available as the GW controller 24 or the GW 40 is not limited to that illustrated in FIG. 31.

The FWH 312 is a memory that stores firmware. This firmware is read into the memory 313 and executed by the CPU 311. In the hard disk device 315, an OS (Operating System), and various types of apps are stored. The CPU 311 can read and execute the OS and the like from the hard disk device 315 via the controller 316 after completion of activating the firmware. A communication via the plurality of NICs 314 can be performed by activating the OS.

The BMC 317 is a management device dedicated to management of the data processing server. The BMC 317, for example, monitors ON/OFF of the CPU 311, and an error that occurs in each of components.

The various types of tables 62a to 65a managed by the GW 40 illustrated in FIG. 6 are stored in the hard disk device 315, and copies of the tables are stored in the memory 313. A program for implementing the configuration of the mechanism illustrated in FIG. 6 is stored, for example, in the hard disk device 315. With this program, the data reception unit 62 and the data transmission unit 65 are implemented, for example, by the CPU 311, the FWH 312, the memory 313, one or more NICs 314, the hard disk device 315, and the controller 316. The GW control unit 61, the data label map unit 63, the label transfer unit 64, and the inter-GW link delay measurement unit 66 are implemented, for example, by the CPU 311, the FWH 312, the memory 313, the hard disk device 315, and the controller 316.

Also the various types of tables 1121 to 1131 managed by the GW controller 24 illustrated in FIG. 11 are stored in the hard disk device 315, and copies of the tables are stored in the memory 313. A program for implementing the configuration of the mechanism illustrated in FIG. 11 is stored, for example, in the hard disk device 315. With this program, the transfer path control unit 1102, the app/data information management unit 1103, and the data label map management unit 1104 are implemented, for example, by the CPU 311, the FWH 312, the memory 313, the hard disk device 315, and the controller 316. The GW control/monitoring unit 1101 communicates with each GW 40, and is implemented, for example, by the CPU 311, the FWH 312, the memory 313, the one or more NICs 314, the hard disk device 315, and the controller 316.

Operations of the GW controller 24 and the GW 40 are described in detail below with reference to sequence diagrams or flowcharts, which are illustrated in FIGS. 25 to 30.

FIG. 25 is a sequence diagram illustrating a flow of processes respectively executed by the GW controller and the GW in order to support an administrator involved in the installment of a GW when the GW is installed. The operations of the GW controller 24 and the GW 40, which are performed when the GW is installed, are initially described in detail with reference to FIG. 25. Actually, an "administrator" illustrated in FIG. 25 is a terminal device operated by the administrator.

Firstly, the administrator installs a needed GW 40 at a secured installation site, wires the GW 40, and powers on the GW 40 (S1). With the power-on of the GW 40, the GW control unit 61 of the installed GW 40 notifies the GW controller 24 of a GWID, an IP address and the like, which are assigned to the local GW 40 (S2). Needed information such as an IP address of the GW controller 24, and the like are set in the installed GW 40 so that the GW 40 can communicate with the GW controller 24. The installed GW 40 waits until the various types of tables 62a to 65a are set.

The GWID, the IP address, and the like, which are transmitted from the GW 40, are received by the GW control/monitoring unit 1101 of the GW controller 24, and output from the GW control/monitoring unit 1101 to the transfer path control unit 1102 (S3). The transfer path control unit 1102 registers the GWID and the IP address, which have been input from the GW control/monitoring unit 1101, to the GW address management table 1121 (SA1)

With the installation of the GW 40, a topology varies. Therefore, the administrator connects a used terminal device to the GW controller 24, and inputs information for updating the GW topology management table 1122 (S4). The input information is received by the GW control/monitoring unit 1101, and output to the transfer path control unit 1102 via the GW control/monitoring unit 1101.

The transfer path control unit 1102 updates the GW topology management table 1122 by registering the information input from the GW control/monitoring unit 1101 to the GW topology management table 1122 (SA2).

When the newly installed GW 40 is an entry GW 40-I or an exit GW 40-O, the administrator needs to update the GW entry/exit management table 1123. Accordingly, in this case, the administrator inputs, for example, information for updating the GW entry/exit management table 1123 (S5). The input information is received by the GW control/monitoring unit 1101, and output to the transfer path control unit 1102 via the GW control/monitoring unit 1101.

The transfer path control unit 1102 updates the GW entry/exit management table 1123 by registering the information input from the GW control/monitoring unit 1101 to the GW entry/exit management table 1123 (SA3). With this update, operations that the administer performs to install the GW 40 are terminated, and also a process that the GW controller 24 executes to support the administrator is terminated.

Figure 26:
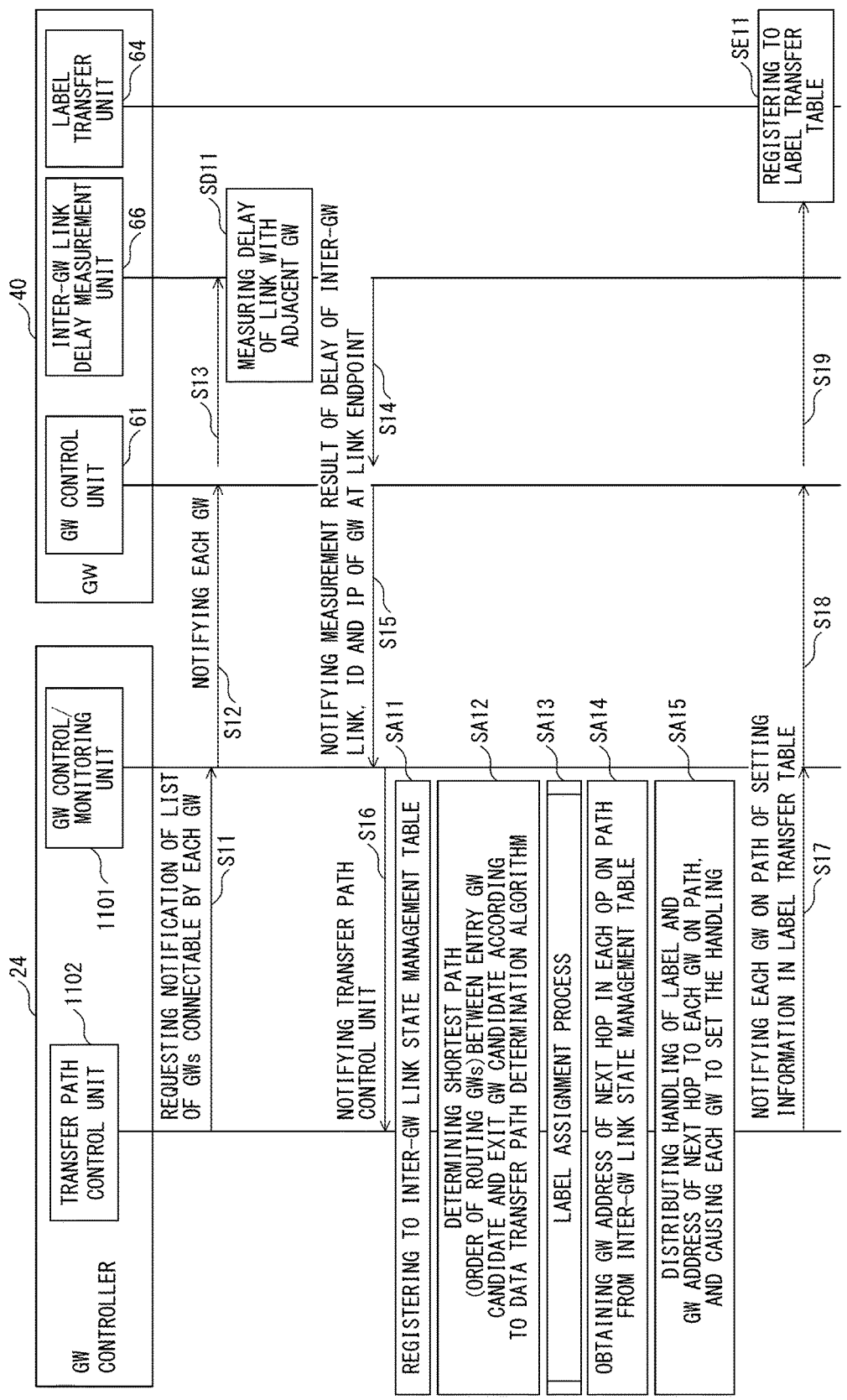
FIG. 26 is a sequence diagram illustrating a flow of processes executed by a GW controller and each GW when the GW controller sets a label path.

FIG. 26 is a sequence diagram illustrating a flow of processes executed by the GW controller and each GW when the GW controller sets a label path. Operations of the GW controller 24 and each GW 40, which are involved in the setting of a label path, are described in detail next with reference to FIG. 26.

A communication state between GWs 40 may possibly vary depending on an occurrence of a fault, a change of a traffic volume, or the like. Accordingly, the GW controller 24 instructs each GW 40 to measure a delay time needed for a communication with an adjacent GW 40, for example, at predetermined timing in this embodiment. This instruction is issued by notifying an IP address of the adjacent GW 40 for each GW 40. Then, the transfer path control unit 1102 requests the GW control/monitoring unit 1101 to notify the IP address of the adjacent GW 40 for each GW 40 (S11). With this request, the GW control/monitoring unit 1101 notifies each GW 40 of the IP address of the adjacent GW 40 (S12).

The notified IP address is received by the data reception unit 62, and input to the inter-GW link delay measurement unit 66 via the GW control/monitoring unit 1101 (S13). Then, the inter-GW link delay measurement unit 66 measures a delay time of a link to each adjacent GW 40 to which the notified IP address is assigned (SD11). When an adjacent GW that has a plurality of IP addresses is present among adjacent GWs 40, the inter-GW link delay measurement unit 66 measures a delay time of a link for each of the IP addresses, and regards a minimum delay time among measured delay times as a measurement result. The inter-GW link delay measurement unit 66 outputs the measurement result of each of the adjacent GWs 40 to the GW control unit 61, and requests the GW control unit 61 to transmit the measurement result to the GW controller 24 (S14). With this request, the measurement result of each of the adjacent GWs 40 is transmitted from the GW control unit 61 to the GW controller 24 via the data transmission unit 65 (S15).

The measurement result of each of the adjacent GWs 40 transmitted from the GW 40 is received by the GW control/monitoring unit 1101 of the GW controller 24, and output to the transfer path control unit 1102 (S16). The transfer path control unit 1102 stores the input measurement result of each of the adjacent GWs 40 to the inter-GW link state management table 1124 (SA11). After completion of updating the inter-GW link state management table 1124, the transfer path control unit 1102 determines the shortest path between an entry GW 40-I candidate and an exit GW 40-O candidate according to a known data transfer path determination algorithm (SA12).

The shortest path is determined and identified for each entry GW 40-I candidate. A result of the identification is registered to the data transfer path management table 1129. After completion of identifying the shortest path, the transfer path control unit 1102 recognizes the identified shortest path as a label path, and executes a label assignment process for assigning a label value by collecting label paths for each exit GW 40-O candidate (SA13).

Figure 27:
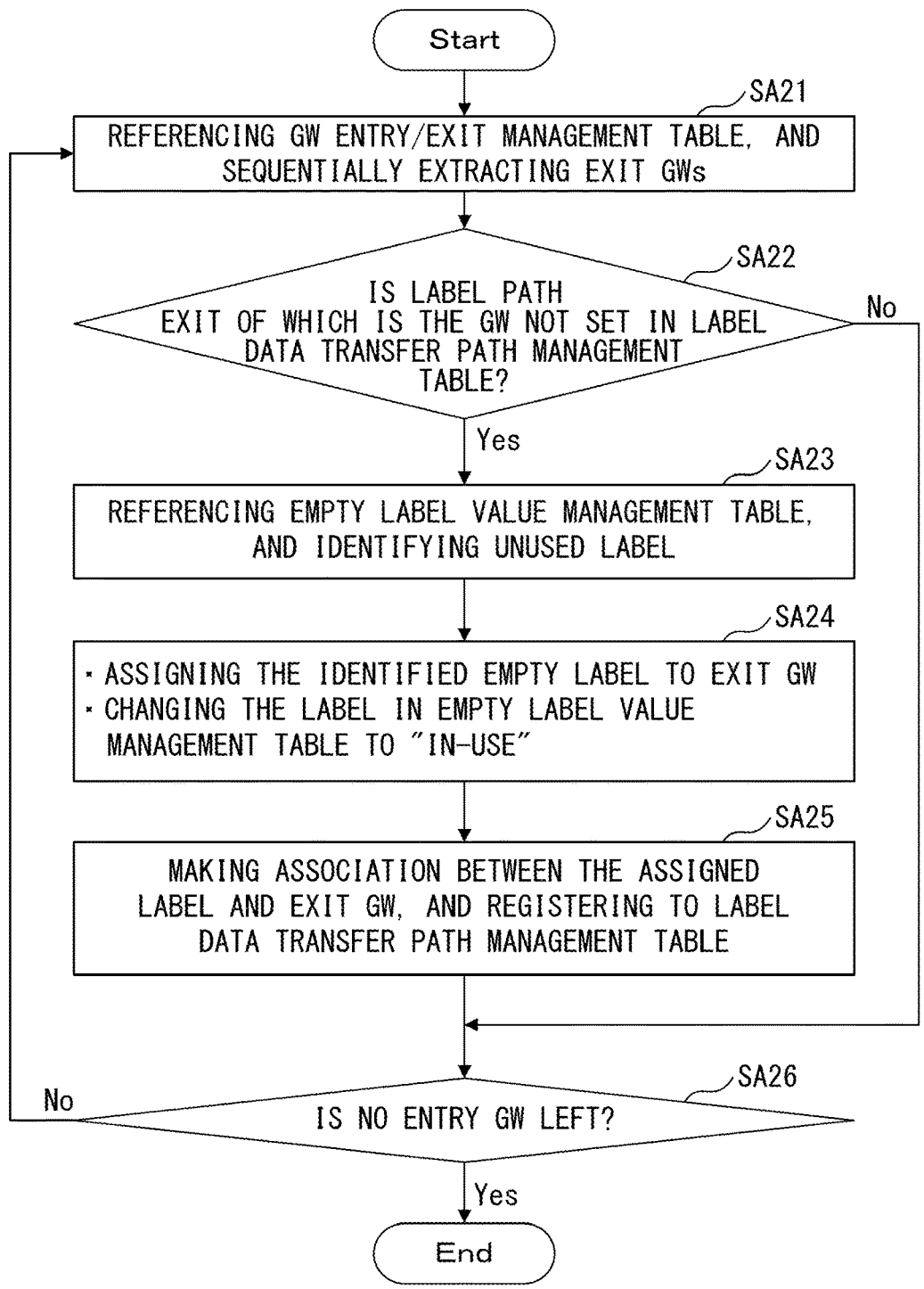
FIG. 27 is a flowchart illustrating a label assignment process.

Here, the label assignment process is described in detail with reference to FIG. 27. Initially, the transfer path control unit 1102 references the GW entry/exit management table 1123, and extracts one exit GW 40-O candidate (SA21). Next, the transfer path control unit 1102 determines whether a label path the exit of which is the extracted exit GW 40-O candidate is unset in the label data transfer path management table 1130. When the label path the exit of which is the extracted exit GW 40-O candidate is not registered to the label data transfer path management table 1130 or if the label path is not reflected on the label data transfer path management table 1130, the determination of SA22 results in "YES". Then, the flow proceeds to SA23. When the label path is reflected on the label data transfer path management table 1130, the determination of SA22 results in "NO". Then, the flow proceeds to SA26.

In SA23, the transfer path control unit 1102 identifies an unused label value by referencing the empty label value management table 1131. Next, the transfer path control unit 1102 assigns the identified label value to the label path the exit of which is the extracted exit GW 40-O candidate, and updates the assigned label value within the empty label value management table 1131 to "in-use" (SA24). Thereafter, the transfer path control unit 1102 registers the label path, to which the label value is assigned, to the label data transfer path management table 1130 (SA25).

The transfer path control unit 1102 that has updated the label data transfer path management table 1130 in this way next determines whether or not a GW 40 yet to be recognized as a process target is left among GWs 40 set as the exit GW 40-O in the GW entry/exit management table 1123 (SA26). When all GWs 40 set as the exit GW 40-O in the GW entry/exit management table 1123 is recognized as process targets, the determination of SA26 results in "YES". Here, the label assignment process is terminated. When a GW 40 yet to be recognized as a process target is left among these GW 40 set as the exit GW 40-O in the GW entry/exit management table 1123, the determination of SA26 results in "NO", and the flow returns to the above described SA21. Then, another exit GW 40-O candidate is extracted as a process target.

Turning back to FIG. 26. The transfer path control unit 1102 that executed the above described label assignment process obtains the address of the GW 40 to which the message 50 is to be transferred next to each GW 40 along the label path (SA14). "GW address of the next hop" illustrated in FIG. 26 means the address of the GW 40 to which the message 50 is to be transferred next. The address of the GW 40 to which the message 50 is to be transferred is identified by referencing the inter-GW link state management table 1124.

The transfer path control unit 1102 that identified the address of the GW 40 to which the message 50 is to be transferred requests the GW control/monitoring unit 1101 to transmit setting information to be stored in each entry of the label transfer table 64*a* for each GW 40 present on any of label paths (SA15 and S17). In the setting information requested to be transmitted, a transfer destination address is set to "Null" in the exit GW 40-O. With this request, the GW control/monitoring unit 1101 transmits the setting information to each specified GW 40 (S18).

The setting information transmitted from the GW control/monitoring unit 1101 to each GW 40 is received by the data reception unit 62 of the GW 40, and output to the label transfer unit 64 via the GW control unit 61 (S19). Then, the label transfer unit 64 registers the input setting information to the label transfer table 64*a*. The registration of the setting information to the label transfer table 64*a* is performed by overwriting the setting information in an entry when the entry where the same label value as that in the setting information is stored is present.

By setting the label transfer table 64*a* in each GW 40, a message transfer along a label path is enabled. However, a section where a message transfer along a label path is not performed is present between a sensor 21 and a server 23. With the message 50 transmitted from the sensor 21, it is needed to identify a label path used to transfer the message 50 transmitted from the sensor 21, and a server 23 to which the message 50 that reached the exit GW 40-O of the label path is to be transferred.

Figure 28B:
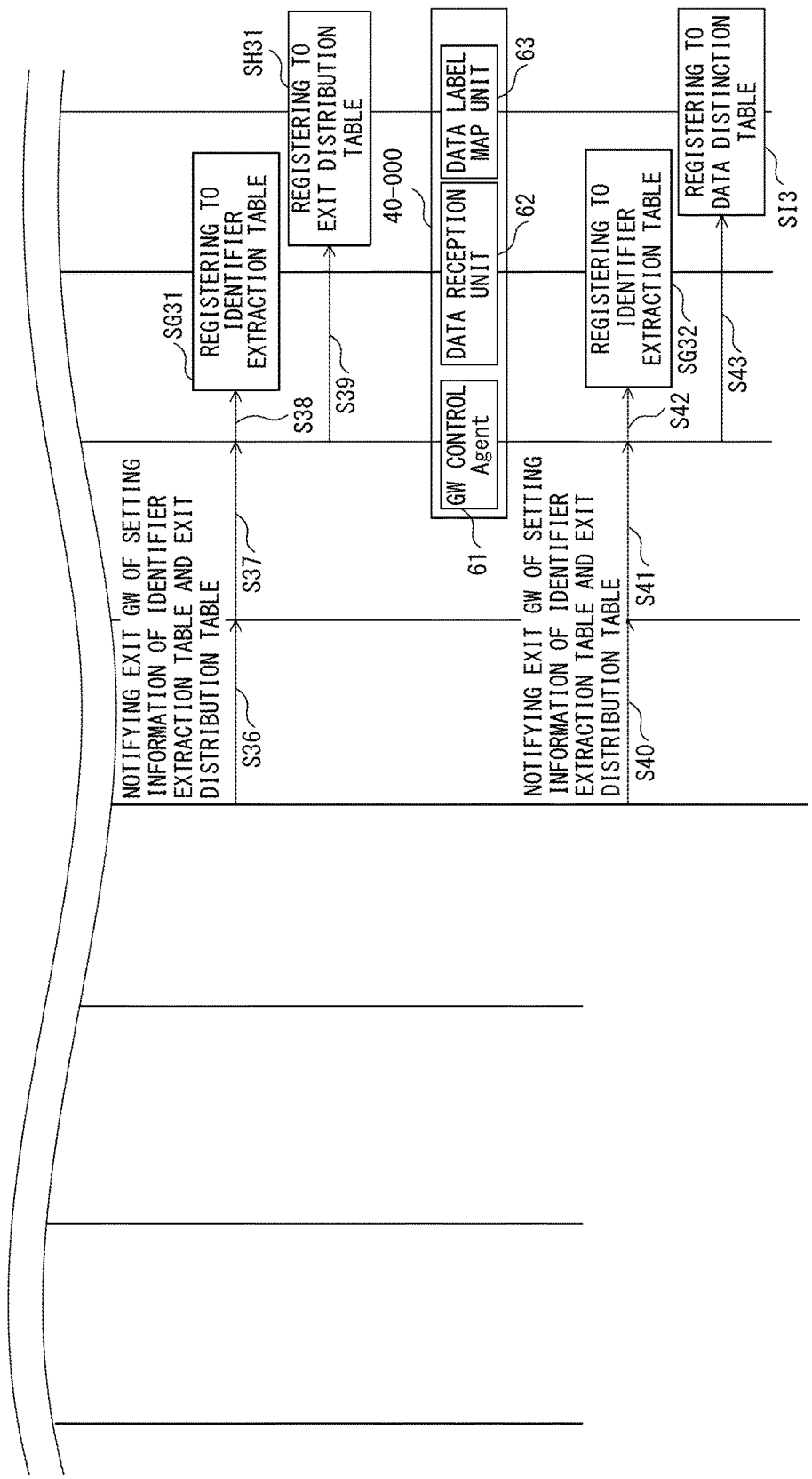

FIGS. 28A and 28B are sequence diagram illustrating a flow of processes executed by the GW controller and each GW when an association is made between data and a label path. Operations of the GW controller 24 and each GW 40, which are performed when an association is made between data and a label path, are described in detail next with reference to FIGS. 28A and 28B. Here, only two GWs such as the floor GW 40-000, which is the entry GW 40-I, and the DCGW 40-040, which is the exit GW 40-O, are selected as the GWs 40 the operations of which are described.

By making an association between data and a label path, the identifier extraction table 62a and the data distinction table 63a are respectively set in the entry GW 40-I as illustrated in FIGS. 7A and 7B. The identifier extraction table 62a and the exit distribution table 65a are respectively set in the exit GW 40-O as illustrated in FIGS. 10A and 10D.

An operator who operates the service app management terminal device 26 connects the service app management terminal device 26 to the GW controller 24, and inputs various items of information about a service app. Specifically, an ID of the service app, and a URL of a server 23 that executes the service app, and a type of data to be received are input as the above described items of information for each service app (S31). Moreover, the operator inputs, for each service app, a pair of the ID of the service app and a GWID of an accommodation GW 40 that accommodates the server 23 executing the service app to which the ID of the service app is assigned (S32). The input information is output to the app/data information management unit 1103 via the GW control/monitoring unit 1101.

In the meantime, an operator who operates the sensor management terminal device 25 connects the sensor management terminal device 25 to the GW controller 24, and inputs various items of information about the sensor 21. Specifically, the operator inputs, for each sensor 21, an ID of a sensor, a URL of the sensor 21, contents of a tag that describes a type of data to be transmitted, position information (such as Xpath) that indicates the position of the tag, and the like as the above described items of information (S33). Moreover, the operator inputs, for each ID of a sensor, a pair of the ID of the sensor and a GWID of an accommodation GW 40 that accommodates the sensor 21 to which the ID of the sensor ID is assigned (S34). The input information is output to the app/data information management unit 1103 via the GW control/monitoring unit 1101.

The app/data information management unit 1103 notifies the data label map management unit 1104 of the information input from the service app management terminal device 26 and the sensor management terminal device 25, and requests the data label map management unit 1104 to make an association between data and a label path (S35). The input information is notified in the form of the various types of tables 1125 to 1128.

With this request, the data label map management unit 1104 executes a process for making an association between data and a label (SF31). The process for making an association between data and a label is a process for making an association among the above described various items of information, identifying a relationship between the associated information and a label path, and for making settings in the identified entry GW 40-I and exit GW 40-O.

FIG. 29 is a flowchart illustrating the process for making an association between data and a label. Here, the process for making an association between data and a label is described in detail with reference to FIG. 29.

Initially, the data label map management unit 1104 makes an association with data by referencing the various types of tables 1125 to 1128 notified from the app/data information management unit 1103 (SF41). With this association, a combination of contents of a tag, an ID of a sensor, position information of an identifier, a GWID of an accommodation GW 40 of a server 23 that executes a service app, an ID of the service app, a GWID of an accommodation GW 40 of a sensor 21 having the ID of the sensor, and the like is identified. An aggregate of data combined into one is hereinafter referred to as "associated information".

Next, the data label map management unit 1104 selects one associated information, and extracts the GWID of the accommodation GW 40 of the server 23 that executes the service app as the GWID of the exit GW 40-O (SF42). At this time, the exit GW 40-I that the GWID of which is extracted is recognized as a distribution destination of setting information (rule) to be stored in each entry of the identifier extraction table 62a and the exit distribution table 65a.

The data label map management unit 1104 references the label data transfer path management table 1130 by using the extracted GWID as a key, and decides a label value of a label path using the GWID as the exit GW 40-O (SF43). The data label map management unit 1104 identifies the GWID of the accommodation GW 40 of the sensor 21, which is present on the label path having the decided label value, as the GWID of the entry GW 40-I (SF44).

The data label map management unit 1104 that has identified the GWID of the entry GW 40-I next decides the entry GW 40-I, the GWID of which has been identified, as a distribution destination GW 40 of setting information (rule) for making an association between data and a label (SF45). This setting information is setting information to be stored in each entry of the identifier extraction table 62a and the data distinction table 63a.

By deciding the entry GW 40-I, the GWID of which is identified, as the distribution destination of the setting information, a process that targets label paths to which the same label value is assigned is terminated. Then, the data label map management unit 1104 next determines whether any other exit GW 40-O is present (SF46). When associated information from which the GWID of the accommodation GW 40 of the server 23 that executes the service app is not extracted as the GWID of the exit GW 40-O is left among the associated information, the determination of SF46 results in "NO", and the flow returns to the above described SF42. When the associated information from which the GWID of the accommodation GW 40 of the server 23 that executes the service app is not extracted as the GWID of the exit GW 40-O is not left, the determination of SF46 results in "YES". Here, the process for making an association between data and a label is terminated.

Turning back to FIGS. 28A and 28B. With the above described process for making an association between data and a label, setting information (rule) of each entry of the identifier extraction table 62a and the exit distribution table 65a, which is to be notified to the exit GW 40-O, is decided by identifying the GWID of the exit GW 40-O. By identifying the GWID of the entry GW 40-I, setting information (rule) of each entry of the identifier extraction table 62a and the data distinction table 63a, which is to be notified to the entry GW 40-I, is decided. Then, the data label map management unit 1104 requests the GW control/monitoring unit 1101 to notify the exit GW 40-O, the GWID of which is identified, of the decided setting information (S36). With this request, the GW control/monitoring unit 1101 notifies the exit GW 40-O, the GWID of which has been identified, of the decided setting information (S37).

The setting information notified to the exit GW 40-O is received by the data reception unit 62, and output to the GW control unit 61. Then, the GW control unit 61 instructs the data reception unit 62 to register the setting information to the identifier extraction table 62a (S38). With this instruction, the data reception unit 62 registers the notified setting information to the identifier extraction table 62a (SG31). Similarly, the GW control unit 61 instructs the data transmission unit 65 to register the setting information to the exit distribution table 65a (S39). With this instruction, the data transmission unit 65 registers the notified setting information to the exit distribution table 65a (SH31).

The data label map management unit 1104 similarly requests the GW control/monitoring unit 1101 to notify the entry GW 40-I, the GWID of which is identified, of the decided setting information (S40). With this request, the GW control/monitoring unit 1101 notifies the entry GW 40-I (here the floor GW 40-000), the GWID of which is identified, of the decided setting information (S41).

The setting information notified to the entry GW 40-I is received by the data reception unit 62, and output to the GW control unit 61. Then, the GW control unit 61 instructs the data reception unit 62 to register the setting information to the identifier extraction table 62a (S42). With this instruction, the data reception unit 62 registers the notified setting information to the identifier extraction table 62a (SG32). Moreover, the GW control unit 61 instructs the data label map unit 63 to register the setting information to the data distinction table 63a (S43). With this instruction, the data label map unit 63 registers the notified setting information to the data distinction table 63a (SI31).

Figure 30:
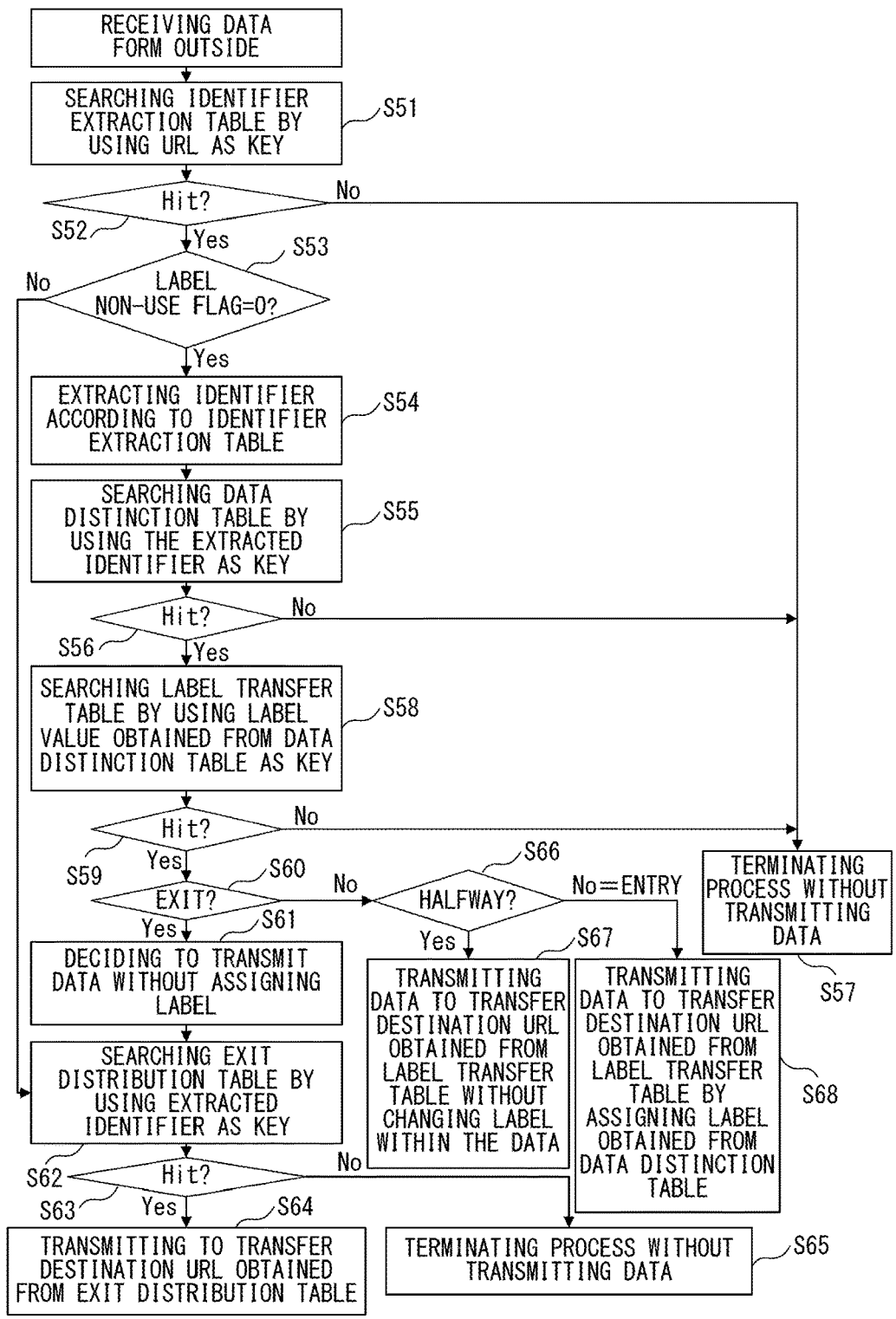
FIG. 30 is a flowchart illustrating a data transfer process.

FIG. 30 is a flowchart illustrating a data transfer process executed by a GW. This data transfer process is a process executed when the data reception unit 62 receives the message 50. Operations that each GW 40 performs to transfer the message 50 are lastly described in detail with reference to FIG. 30. Here, the description is provided by assuming that the process is executed by the CPU 311.

Initially, the CPU 311 reads a URL from the header 51 of the message 50, and searches the identifier extraction table 62a by using a path name within the read URL as a key (S51). Next, the CPU 311 determines whether a corresponding entry hits by searching the identifier extraction table 62a (S52). When an entry that stores the read path name is present in the identifier extraction table 62a, the entry hits. Therefore, the determination of S52 results in "YES", and the flow proceeds to S54. When the entry that stores the read path name is not present in the identifier extraction table 62a, no entries hit. Therefore, the determination of S52 results in "NO", and the data transfer process is terminated without transferring the received message 50 (S57).

SA53 illustrated in FIG. 30 is a process executed in a further embodiment to be described later. Therefore, SA53 is described in the further embodiment.

In S54, the CPU 311 extracts contents of a tag from the body 52 of the message 50 according to the hit entry. Next, the CPU 311 searches the data distinction table 63a by using the extracted contents of the tag as a key (S55). After the CPU 311 searches the data instruction table 63a, it determines whether or not the corresponding entry hits as a result of searching the data distinction table 63a (S56). If the entry that stores the extracted contents of the tag is present in the data distinction table 63a, the entry hits. Therefore, the determination of S56 results in "YES", and the flow proceeds to S58. If the entry that stores the extracted contents of the tag is not present in the data distinction table 63a, no entries hit. Therefore, the determination of S56 results in "NO", and the data transfer process is terminated without transferring the received message (S57).

In S58, the CPU 311 reads the label value stored in the hit entry, and searches the label transfer table 64a by using the read label value as a key. After the CPU 311 searches the label transfer table 64a, it determines whether the corresponding entry hits as a result of searching the label transfer table 64a (S59). When the entry that stores the extracted label value is present in the label transfer table 64a, the entry hits. Therefore, the determination of S59 results in "YES", and the flow proceeds to S60. When the entry that stores the extracted label value is not present in the label transfer table 64a, no entries hit. Therefore, the determination of S59 results in "NO", and the data transfer process is terminated without transferring the received message 50 (S57).

In S60, the CPU 311 determines whether the local GW 40 is an exit GW 40-O by referencing GW placement information stored in the hit entry. When the GW placement information does not indicate the exit GW 40-O, the determination of S60 results in "NO", and the flow proceeds to S66. When the GW placement information indicates the exit GW 40-O, the determination of S60 results in "YES", and the flow proceeds to S61.

In S61, the CPU 311 decides to transfer the message not along a label path but according to the exit distribution table 65a. Then, the CPU 311 next searches the exit distribution table 65a by using the extracted contents of the tag as a key (S62).

After the CPU 311 searches the exit distribution table 65a, it determines whether a corresponding entry hits by searching the exit distribution table 65a (S63). When the entry that stores the extracted contents of the tag is present in the exit distribution table 65a, this entry hits. Therefore, the determination of S63 results in "YES", a transfer destination address stored in the hit entry is overwritten as a transmission destination address of the header 51, and the message 50 is transmitted (S64). With this transmission, the data transfer process is terminated. When the entry that stores the extracted contents of the tag is not present in the exit distribution table 65a, no entries hit. Therefore, the determination of S63 results in "NO", and the data transfer process is terminated without transferring the received message 50 (S65).

In S66 to which the flow proceeds after the above described determination of S60 results in "NO", the CPU 311 references GW placement information stored in the hit entry, and determines whether the local GW 40 is a halfway GW 40. If the GW placement information does not indicate the halfway GW 40, the determination of S66 results in "NO", and the flow proceeds to S68. When the GW placement information indicates the halfway GW 40, the determination of S66 results in "YES", and the flow proceeds to S67.

In S67, the CPU 311 overwrites a transfer destination address stored in the hit entry as a transmission source address of the header 51, and transmits the message 50. With this transmission, the data transfer process is terminated.

The determination of the above described S66, which results in "NO", means that the local GW 40 is the entry GW 40-I. Thus, in S68 to which the flow proceeds after the determination of S66 results in "NO", the CPU 311 writes, to the header 51, identification information of a label value in the hit entry in the data distinction table 63a, and a transfer destination address of the hit entry in the label transfer table 64a. After the message 50 where such operations is performed for the header 51 is transmitted, this data transfer process is terminated.

A further embodiment is hereinafter described in detail. The above described embodiment assumes that the number of exit GWs 40-O is relatively small. However, when the number of DCs 33 is large, and when the number of accommodation GWs 40 that accommodate a sensor 2 present in a field is large, the number of entries stored in the label data transfer path management table 1130, namely, the number of used label values increases. The further embodiment is intended to reduce the number of used label values.

Also in the further embodiment, configurations of the GW controller 24 and each GW 40 are basically the same as those of the above described embodiment. Most operations are the same. Thus, the description is provided by focusing only portions different from the above described embodiment with the use of the reference numerals assigned in the above described embodiment.

FIG. 32 is an explanatory diagram of an example of a management method of a data transfer path enabled in the further embodiment. In FIG. 32, a GW 40-T is a GW 40 that terminates a label path halfway. In the further embodiment, a termination GW 40-T can terminate a message transfer along a label path, so that the number of used label values can be reduced even if the number of exit GWs 40-O is larger than that of termination GWs 40-T. In the configuration illustrated in FIG. 3, it is preferable to select an area GW 40 placed in the WAN 32 as a termination GW 40-T.

FIGS. 33A to 33D are explanatory diagrams of examples of contents of the tables 62a to 65a stored by a GW 40-030 in the further embodiment. FIGS. 34A to 34D are explanatory diagrams of examples of contents of the tables 62a to 65a stored by a GW 40-040.

As illustrated in FIG. 33A, a label non-use flag is stored in an entry of the identifier extraction table 62a in the further embodiment. This label non-use flag is a flag for specifying whether to terminate a label path halfway. "1" denoted as content of the label non-use flag is a value for terminating a label path at a current point, and for deciding a transfer destination according to data stored in the body 52 of the message 50. Thus, the label transfer table 64a and the exit distribution table 65a, which are illustrated in FIGS. 33C and 33D, are set in the area GW 40-030. As a result, the area GW 40-030 operates like the exit GW 40-O. "0" of the label non-use flag indicates that the label path is not terminated halfway.

In contrast, "1" is denoted as the content of the label non-use flag also in the DCGW 40-040, which is an original exit GW 40-O, as illustrated in FIG. 34A. Accordingly, the DCGW 40-040 identifies the transfer destination of the message 50 by referencing the exit distribution table 65a illustrated in FIG. 34D.

The termination of the label path is controlled with the above described label non-use flag. Therefore, when the determination of S52 results in "YES" in the data transfer process illustrated in FIG. 30, the flow next proceeds to S53. In S53, the CPU 311 determines whether the value of the label non-use flag is "0". When the value of the label non-use flag is "0", the determination of S53 results in "YES", and the flow proceeds to S54. In this way, a message transfer along a label path is implemented without terminating the label path halfway.

In contrast, when the value of the label non-use flag is "1", the determination of S53 results in "NO", and the flow proceeds to S62. In this way, the transfer destination of the message 50 is decided according to the exit distribution table 65a.

FIG. 35 is an explanatory diagram of a configuration example of the GW entry/exit management table in the further embodiment. In the further embodiment, in each entry of the GW entry/exit management table 1123, termination GW information indicating whether the local GW 40 is a termination GW 40-T is stored in addition to a GWID, entry GW information, and exit GW information as illustrated in FIG. 35. "1" denoted as the termination GW information indicates that the GW 40 to which the GWID is assigned may be a termination GW 40-T.

FIG. 36 is an explanatory diagram of a configuration example of the label data transfer path management table in the further embodiment. In each entry of the label data transfer path management table 1130 in the further embodiment, a GWID of the termination GW 40-T is stored as a replacement for the GWID of the exit GW 40-O as illustrated in FIG. 36 when a label path is terminated halfway.

When a GW 40 through which many label paths pass is set as the termination GW 40, the label paths can be collected into one. Accordingly, a used quantity of label values can be reduced, and the number of entries for storing setting information in the data distinction table 63a can be decreased.

Reductions in the used quantity of label values enable the number of entries to be prepared for the various types of tables 62a to 65a stored in a GW 40 to be further decreased. Therefore, also a memory capacity needed to store the various types of tables 62a to 65a can be reduced, and settings of the various types of tables 62a to 65a can be made more quickly.

Figure 37:
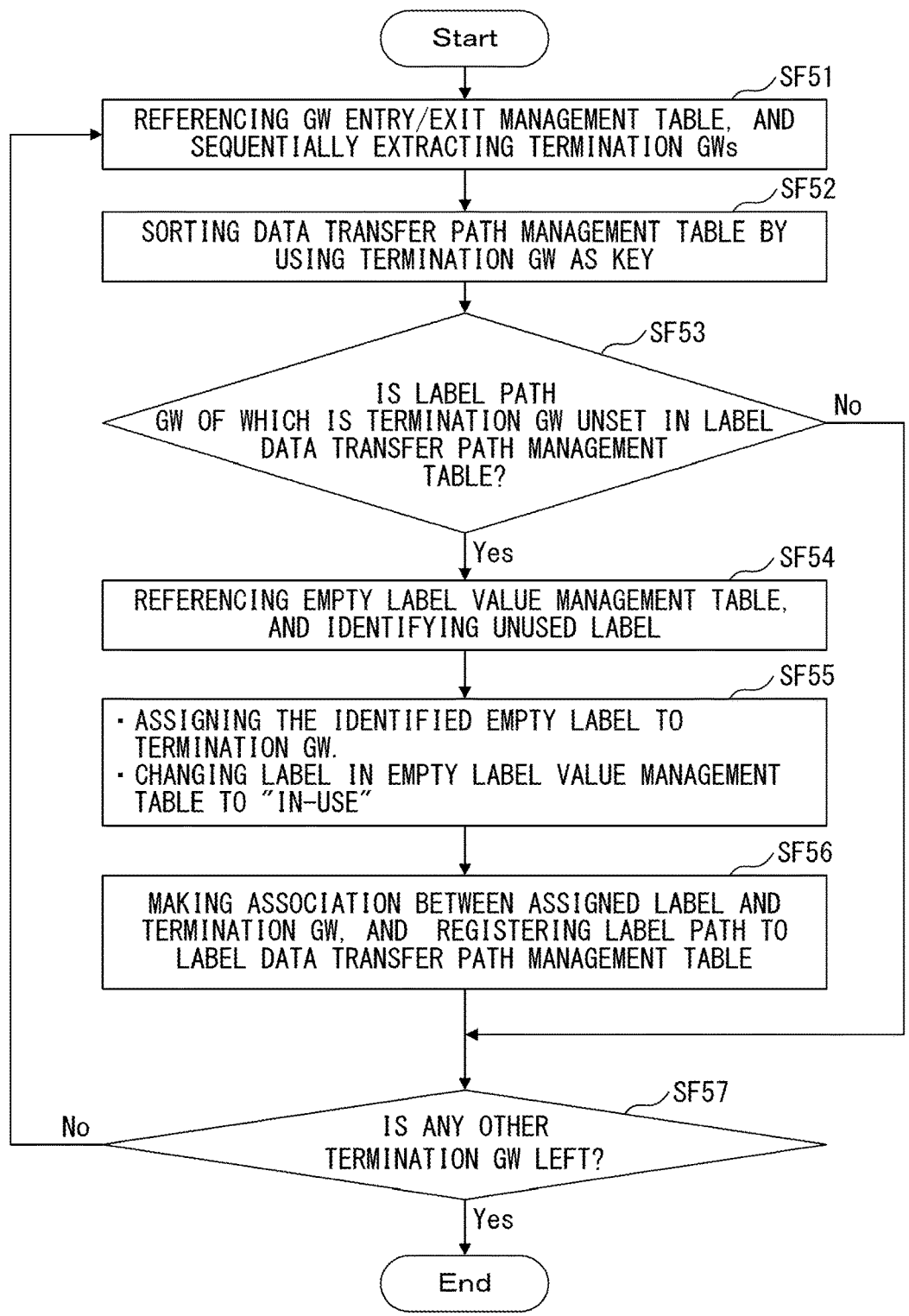
FIG. 37 is a flowchart illustrating a label assignment process (further embodiment).

FIG. 37 is a flowchart illustrating a label assignment process executed in the further embodiment. The label assignment process executed in the further embodiment is described in detail next with reference to FIG. 37. FIG. 37 assumes that a label path is terminated halfway, and illustrates a flowchart of the label assignment process. FIG. 37 also assumes that the data transfer path management table 1129 and the label data transfer path management table 1130 have been already created.

Initially, the transfer path control unit 1102 references the GW entry/exit management table 1123, and extracts one termination GW 40-T candidate (SF51). Next, the transfer path control unit 1102 sorts transfer path information stored in the data transfer path management table 1129 by using a GWID of the extracted termination GW 40-O candidate as a key (SF52).

Next, the transfer path control unit 1102 determines whether an entry where the candidate the GWID of which is extracted is set as the termination GW 40-T is unset in the label data transfer path management table 1130 (SF53). When a label path that terminates the termination GW 40-T candidate the GWID of which is extracted is not registered in the label data transfer path management table 1130, or when the label path is not reflected on the label data transfer path management table 1130, the determination of SF53 results in "YES". Then, the flow proceeds to SF54. When the label path is reflected on the label data transfer path management table 1130, the determination of SF53 results in "NO", and the flow proceeds to SF57.

In SF54, the transfer path control unit 1102 identifies an unused label value by referencing the empty label value management table 1131. Next, the transfer path control unit 1102 assigns the identified label value to the label path that terminates the extracted termination GW 40-T candidate, and updates the assigned label value in the empty label value management table 1131 to "in-use" (SF55). Thereafter, the transfer path control unit 1102 registers the label path, to which the label value has been assigned. to the label data transfer path management table 1130 (SF56).

The transfer path control unit 1102 that updates the label data transfer path management table 1130 in this way next determines whether a GW yet to be recognized as a process target is left among GWs 40 set as the termination GW 40-T in the GW entry/exit management table 1123 (SF57). When all GWs set as the termination GW 40-T in the GW entry/exit management table 1123 targets all GWs 40 is recognized as a process target, the determination of SF57 results in "YES". Here, the label assignment process is terminated. When a GW 40 yet to be recognized as a process target is left among the GWs 40 set as the termination GW 40-O in the GW entry/exit management table 1123, the determination of SF57 results in "NO". Then, the flow returns to the above described SF51. Then, another termination GW 40-O candidate is extracted as a process target.

Also in the above described embodiment and the further embodiment, GWs 40 recognized as an entry GW 40-I, an exit GW 40-O, or a termination GW 40-T differ depending on a transmission source of the message 50. Depending on a topology, a transfer path between two GWs 40 may be used as a common label path regardless of the transmission source of the message 50.

Additionally, the above described embodiment and the further embodiment assume the relay devices are only the GWs 40. However, the relay devices are not the GWs 40 as long as the relay devices can perform the above described message transfer. A plurality of types of relay devices may be employed.

Furthermore, in the above described embodiment and the further embodiment, the GWs 40 are definitely classified as any of an entry GW 40-I, an exit GW 40-O, and a halfway GW 40 (including a termination GW 40-T). Actually, however, GWs cannot be always classified as any of the entry GW 40-I, the exit GW 40-O, and the halfway GW 40. A GW 40 sometimes corresponds to two or more of the entry GW 40-I, the exit GW 40-O, and the halfway GW 40.

As described above, a placement of a sensor at a site where data cannot be suitably transferred can be more quickly handled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data transfer control method in a system where a plurality of relay devices that relay a data transfer between a plurality of sensors and one or more data processing servers, and a data transfer control device that controls the plurality of relay devices, are arranged, the method comprising:

partitioning, by a processor of the data transfer control device, a transfer path between a first sensor and a first data processing server into at least a first transfer path, which is a transfer path between the first sensor and a first relay device that initially receives data transmitted from the first sensor, a second transfer path including one or more second relay devices, which is a transfer path from the first relay device to a third relay device that transfers the data transmitted from the first sensor to the first data processing server, and a third transfer path, which is a transfer path between the third relay device and the first data processing server;

managing, by the processor, setting information in which first data and second data are associated with each other, the first data being included in the transferred data and indicating a type of the transferred data, the second data being assigned to each of the third relay devices and identifying the second transfer path;

managing, by the processor, transfer path management information in which the second data is associated with identification information of each of the first, second, and third relay devices included in the second transfer path, wherein one value is set as the second data for identifying a plurality of second transfer paths when an exit of the plurality of second transfer paths is one third relay device;

when a sensor has been added, adding, by the processor, the first data and the second data to the setting information, the first data designating the type of the transferred data from the added sensor, the second data being data that has been assigned to the third relay device that is a destination of the transferred data from the added sensor;

transmitting, by the processor, the setting information to the first relay device;

implementing, by the processor, a data transfer between each of the sensors and the data processing server by respectively controlling a pair of the first transfer path and the second transfer path, and a pair of the second transfer path and the third transfer path;

by the first relay device, selecting the second data corresponding to the first data based on the setting information, adding the selected second data to the transferred data, and transmitting, to the second relay device, the transferred data with the selected second data added thereto;

determining, by the second relay device, a transfer destination for the transferred data based on the second data.

2. The data transfer control method according to claim 1, wherein when a transfer path for performing the data transfer from the sensor to the data processing server is assumed as the transfer path, the second transfer path is managed, by the processor, for each of a plurality of third relay devices in a case where the plurality of third relay devices connected to one or more data processing servers are present.

3. A relay device in a system where a plurality of relay devices that relay a data transfer between a plurality of sensors and one or more data processing servers, and a data transfer control device that controls the plurality of relay devices, are arranged, the relay device comprising a processor configured to execute a process including:

receiving setting information in which first data and second data are associated with each other, the first data indicating a type of the transferred data, the second data being assigned to each of the relay devices that transmit the data to the data processing servers and identifying a transfer path among the plurality of relay devices, wherein one value is set as the second data for identifying a plurality of transfer paths when transfer path management information indicates that an exit of the plurality of transfer paths is one relay device, the transfer path management information being information in which the second data is associated with identification information of each of the plurality of relay devices included in the transfer path;

when a sensor has been added, receiving the setting information with the first data and the second data added thereto, the first data designating the type of the transferred data from the added sensor, the second data being data that has been assigned to the third relay device that is a destination of the transferred data from the added sensor;

receiving transferred data;

extracting the first data from the received data;

extracting second data different from the first data from the received data;

deciding a transfer destination of the received data based on the first data;

deciding a transfer destination of the received data based on the second data;

validating one of the decision made based on the first data and the decision made based on the second data;

transmitting the received data to the transfer destination the decision of which is validated; and selecting the second data corresponding to the first data based on the setting information when the decision based on the first data is validated, adding the selected second data to the transferred data, and transmitting the transferred data with the selected second data added thereto.

4. The relay device according to claim 3, wherein the second data is identified by using the first data, and added to data to be transmitted.

5. The relay device according to claim 3, further comprising a storage device configured to store transfer management information indicating whether the second data is valid, wherein when data to which the second data that is not validated in the transfer management information stored in the storage device is added is received, the processor validates the decision made based on the first data.

6. A data transfer control device comprising:

a memory; and a processor configured to execute a process including:

setting a first transfer path for transferring data to be transferred based on first data within the data to be transferred on a transfer path between a sensor and a data processing server;

selecting a first relay device that transfers the data based on the first data within the data from among relay devices present in the first transfer path for each first transfer path;

selecting a second relay device that decides a transfer destination of the data based on second data that is extracted from the data and different from the first data from among the relay devices present in the first transfer path for each first transfer path;

selecting a third relay device that extracts the second data from the data and adds, to the data, a transfer destination address made to correspond to the extracted second data from among the relay devices present in the first transfer path for each first transfer path;

making a first setting for transferring the data based on the first data in the first relay device;

making a second setting for deciding the transfer destination of the data based on the second data in the second relay device;

making a third setting for adding, to the data, the transfer destination address made to correspond to the second data in the third relay device;

transmitting, to the first relay device, setting information in which the first data and second data are associated with each other, the first data being included in the transferred data and indicating a type of the transferred data, the second data being assigned to each of the third relay devices and identifying the second transfer path; and managing transfer path management information in which the second data is associated with identification information of each of the first, second, and third relay devices included in the second transfer path, wherein one value is set as the second data for identifying a plurality of second transfer paths when an exit of the plurality of second transfer paths is one third relay device;

when a sensor has been added, adding the first data and the second data to the setting information, the first data designating the type of the transferred data from the added sensor, the second data being data that has been assigned to the third relay device that is a destination of the transferred data from the added sensor; and the memory has the setting information stored therein.

7. The data transfer control device according to claim 6, wherein the first transfer paths are collectively managed based on a relay device positioned last in the first transfer path, and a management result of the first transfer paths is reflected on the first, the second, and the third settings.

* * * * *